United States Patent
Siegel

(10) Patent No.: US 9,781,946 B2
(45) Date of Patent: Oct. 10, 2017

(54) FLAVORING SUBSTANCE-INCLUDED COMPOUNDS

(75) Inventor: Sven Siegel, Höxter (DE)

(73) Assignee: Symrise AG, Holzminden (DE)

( * ) Notice: Subject to any disclaimer, the term of this patent is extended or adjusted under 35 U.S.C. 154(b) by 505 days.

(21) Appl. No.: 13/700,205

(22) PCT Filed: May 27, 2010

(86) PCT No.: PCT/EP2010/057365
§ 371 (c)(1),
(2), (4) Date: Feb. 12, 2013

(87) PCT Pub. No.: WO2011/147455
PCT Pub. Date: Dec. 1, 2011

(65) Prior Publication Data
US 2013/0202746 A1 Aug. 8, 2013

(51) Int. Cl.
*A23L 1/00* (2006.01)
*A23L 1/22* (2006.01)
*A23L 27/00* (2016.01)

(52) U.S. Cl.
CPC ........... *A23L 1/22025* (2013.01); *A23L 27/74* (2016.08); *A23L 27/75* (2016.08); *A23G 2200/06* (2013.01)

(58) Field of Classification Search
CPC ...... A23L 1/22025; A23L 27/74; A23L 27/75; A23G 2200/06
USPC .......... 426/89, 103, 534, 538, 650, 651, 658
See application file for complete search history.

(56) References Cited

U.S. PATENT DOCUMENTS

| | | | | |
|---|---|---|---|---|
| 7,465,469 | B2* | 12/2008 | Ben-Yehoshua | 426/331 |
| 2006/0039959 | A1* | 2/2006 | Wessling | A61K 9/7007 424/448 |
| 2009/0035229 | A1* | 2/2009 | Eirew | A61Q 11/00 424/52 |
| 2010/0272859 | A1* | 10/2010 | Given | A23L 1/22016 426/66 |

FOREIGN PATENT DOCUMENTS

| | | |
|---|---|---|
| CA | 2400957 A1 | 2/2003 |
| EP | 0328317 A1 | 8/1989 |
| EP | 1167435 A2 | 1/2002 |
| KR | 100300670 B1 | 11/2001 |
| WO | WO-03054077 A1 | 7/2003 |
| WO | WO-2006106520 A2 | 10/2006 |

OTHER PUBLICATIONS

Ashurst, P.R., ed., Food Flavorings, Second edition, 1995, Blackie Academic & Professional, London, pp. 30-35.*
Maier, H.G., et al., "Thermostabile Bindung von Aromastoffen an Starke Teil 1: Bildung durch Gefriertrocken," Starch/Starke, vol. 39, No. 4, 1987, pp. 126-131, XP002622358.
Database FSTA [Online] International Food Information Service (IFIS),Frankfurt-Main, DE; Maier H G: "Modern ideas on physical and chemical binding of aroma substances" XP002622359; Database accession No. FS-1973-03-A-0137, Abstract & "Moderne Vorstellungen ueber die physikalische and chemische Bindung von Aromastoffen." Dechema-Monographien, vol. 70,1972,pp. 323-335.
Database WPI Week 197547 Thomson Scientific, London, GB; AN 1975-77780W XP002168559 & JP 50 083454 A (Teijin Ltd) Jul. 5, 1975 (Jul. 5, 1975), abstract.
International search report with references cited and written opinion under Rule 43 PCT attached to the search report, International Application No. PCT/EP2010/057365, filed May 27, 2010.

* cited by examiner

*Primary Examiner* — Leslie Wong
(74) *Attorney, Agent, or Firm* — Dilworth & Barrese, LLP

(57) ABSTRACT

The present invention concerns flavoring substance-included compounds comprising or consisting of a polymer part and certain included flavoring substances. These flavoring substance-included compounds may be present in the form of mixtures with accompanying substances and possibly water.
The present invention also concerns a method for producing flavoring substance-included compounds, the use of flavoring substance-included compounds according to the invention as a means of flavoring preparations or semi-finished products for nourishment or pleasure and corresponding preparations and semi-finished products for nourishment or pleasure.

32 Claims, No Drawings

FLAVORING SUBSTANCE-INCLUDED COMPOUNDS

CROSS-REFERENCE TO RELATED APPLICATIONS

This application is a national stage application (under 35 U.S.C. §371) of PCT/EP2010/057365, filed May 27, 2010, which is incorporated herein by reference in its entirety.

The present invention concerns flavoring substance-included compounds comprising or consisting of a polymer part and certain included flavoring substances. These flavoring substance-included compounds may be present in the form of mixtures with accompanying substances and possibly water.

The present invention also concerns a method for producing flavoring substance-included compounds, the use of flavoring substance-included compounds according to the invention as a means of flavoring preparations or semi-finished products for nourishment or pleasure and corresponding preparations and semi-finished products for nourishment or pleasure.

Flavoring substances are predominantly volatile compounds which during storage or also processing in the food industry demonstrate high loss rates, for example due to volatilization, evaporation, vaporescence, steam distillation and oxidation. Because of these stated and other negative circumstances flavoring substances in the most varied of application areas frequently demonstrate insufficient stability, so that for example the flavor intensity perceived at the time of consumption is lessened, the flavoring profile changed and undesired wrong taste notes possibly formed.

In order to stabilize flavoring substances in the known state of the art additives are mainly used, such as for example antioxidants, or/and the flavoring substances are protected by encapsulation. The use of additives should only take place, however, where their application is absolutely essential, and even then the quantity used should be kept as low as possible. Antioxidants in themselves do not as a rule contribute to reducing the volatility of flavoring substances either.

In order to reduce volatilization of flavoring substances encapsulation products are often used. The normal excipients used for this mostly have one or more frequently even more disadvantages, however. Thus, for example, native starches, maltodextrins and sugar can be cariogenic. Sugar alcohols used as a substitute for these substances remove the problem cariogenity, but in large quantities can often have a laxative effect. Yeast cells can be used to increase flavor retention during cooking, baking and deep-frying, but often have a pronounced taste of their own, which may be undesirable in some applications. When animal protein is used numerous religious and ethnic issues and special dietary practices (e.g. vegetarianism) have to be taken into account, so that encapsulated products containing animal protein will often be rejected by certain consumers. The replacement of animal protein by vegetable protein is not always possible because of the to some extent highly different characteristics. In the past other raw materials have sometimes been in scarce supply. One such product is gum Arabic, the main producing country of which is Sudan which was affected by civil war for many years.

Where a combination of, for example, oxidation protection and volatilization protection of flavoring substances is required, for many excipients (used in encapsulation) a disadvantageous encapsulation in combination with the use of antioxidants is necessary. Thus, for example, it is advisable to provide orange oil encapsulated in yeast cells with additional protection by antioxidants in order to achieve a longer shelf life. In principle oxidation stability in combination with very good volatilization protection can also be achieved by the sole use of cyclodextrins, but under the legislation in Europe the use of beta-cyclodextrin for encapsulation of flavoring substances is only permitted to a certain extent and for other cyclodextrins hardly at all.

Many excipients used in encapsulations can also be used by the body for energy. In highly-developed industrialized countries the excessive consumption of energy from food has proven to be problematical and is increasingly leading to obesity and to the associated concomitant diseases such as diabetes, cardio-circulatory disorders and muscular-skeletal and locomotor system complaints. Many excipients, in particular starch, maltodextrins, glucose and sucrose, after being broken down by enzymes are metabolized in the body in an insulin-dependent manner. However, a high and ever-increasing proportion of the population, in particular in the highly-developed industrialized countries, suffers from the metabolic disorder of diabetes, for which reason the introduction of insulin-dependent metabolizing substances should be controlled as far as possible.

For the production of flavoring-substance included compounds, currently only a limited number of potential host compounds is available. The possibilities to specifically adjust the properties of the flavoring substance included compound have thus been limited so far. For example, there is a need in the art to specifically select texture, viscosity and release rate of flavoring substances and to broaden the available ranges of these parameters. However, the set of potential host compounds had been too limited so far to achieve a satisfactory range of available textures, viscosities and release rates.

The first problem for the present invention was therefore to provide a product with flavoring substances, in particular an encapsulation product with flavoring substances, in which the flavoring substances demonstrate an increased stability and wherein the product or the encapsulation product preferably does not have some or all of the above-mentioned disadvantages.

Also a problem for the present invention was to indicate a method for producing such products or encapsulation products.

Further problems for the present invention are illustrated by the following explanations and the attached claims.

The primary problem is solved according to the invention by an inclusion compound, comprising or consisting of
(i) a polymer of Formula (I),

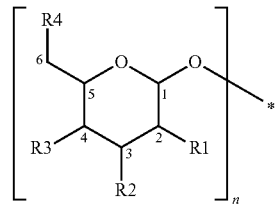

wherein n is at least 8, preferably a natural number in the range of 8-20000, more preferably in the range of 8-15000, even more preferably in the range of 50-10000, even more preferably in the range of 100-8000 and even more preferably in the range of 150-6000, and wherein for each individual monomer set in brackets in formula (I):

R1 is —OH, —NH2 or —NH—CO—CH3,
one or two moieties selected from R2, R3 and R4 are —OH, and otherwise are —H, and
instead of any remaining moiety or moieties R2, R3 and R4, the corresponding carbon atom at position 3, 4 and 6, respectively, is covalently linked to another monomer via the free bond of oxygen of formula (I), wherein the polymer is no cellulose or amylose,
and
(ii) one, two, three, four or more flavoring substances included in the polymer of formula (I), except alkanoic acids with 1 to 4 carbon atoms.

More detailed explanations and preferred embodiments of a flavoring substance-included compound according to the invention are given in the following.

Such a flavoring substance-included compounds are not known from the state of the art.

Within this specification, the terms "inclusion compound", "flavoring substance-included compounds", "encapsulation product" of the present invention are used interchangeably, unless noted otherwise. Also, "flavoring substance" and "aroma substance" are used interchangeably, unless noted otherwise.

PRIOR ART

Inclusion compounds comprising a variety of flavoring substances included in amylose are known particularly from scientific literature. Such inclusion compounds are produced by precipitation from water-containing solutions. A disadvatage of their manufacturing processes is that they take long time, provide low yield and lead to high losses of flavoring substances.

It was speculated that inclusion compounds of flavoring substances in amylopectin could be produced in water-containing solutions with a short half-life time; however, all attempts to stabilize such putative inclusion compounds and to provide them in dried form have failed so far.

U.S. Pat. No. 4,223,023 discloses complexes of fatty acids and chitosan and their manufacture from water-based emulsions. The complexes are not isolated or produced as a dry product.

U.S. Pat. No. 4,574,150 discloses dry, free-flowing, water soluble chitosan-carboxylic acid complexes and a method of manufacture thereof.

WO 2006106519 discloses a hydrophilic inclusion complex consisting essentially of nanoparticles of an active compound in an amorphous form, and an amphiphilic polymer, wherein the amphiphilic polymer covers the active compound, such that no covalent bonds are formed between the active compound and the amphiphilic polymer in the inclusion complex. The amphiphilic polymer is, for example, a natural polysaccharide, natural or modified starch, chitosan or alginate. The particle size is up to 1000 nm, and the content of included active compound within the dry inclusion complex is up to 2%. Active compounds are, for example, pharmaceutical compounds, food additives, cosmetics, pesticides and animal food, but not flavoring substances. Manufacture of the inclusion complex comprises a step of complete dissolution of the amphiphilic polymer.

WO 2006106520 discloses manufacture of a hydrophilic dispersion including nanoparticles of a hydrophilic inclusion complex by dissolving of an amphiphilic polymer, and causing interactions between the dissolved amphiphilic polymer and an active compound under conditions suitable for the formation of a hydrophilic dispersion. The conditions for such formation of a hydrophilic dispersion are not described.

A particular disadvantage of the disclosures of WO 2009106519 and WO2006106520 is that the inclusion compounds cannot be formed with liquid aroma substances. Also, production of the inclusion complexes is mainly done according to a try-and-error approach. Non-working selections of manufacturing conditions could be reduced by special software, but cannot reliably be removed. Particularly, finding suitable combinations of polymer and active substance has proven too difficult for most applications.

The flavoring substance according to the invention is an inclusion compound in the sense of the following definition: An inclusion compound consists of so-called host (here: polymer) and guest (here: flavoring agent(s)). The host substances make voids available at the molecular level, in which guest substances are embedded (included). The void can be present in the molecule of the host substance itself (intramolecular inclusion compound) or in combination with the host molecules (e.g. crystal lattice). The nature of the inclusion compounds is such that the guest substances are not present by integration through primary and secondary valency bonds, but mainly though spatial fencing-in in the host substance. One way of distinguishing included flavoring substances from non-included flavoring substances (for example those bonded to the surface) in the context of the present invention is described below.

According to the present invention, alkanoic acids with 1 to 4 carbon atoms are not included in the compounds of the present invention. Specifically, alkanoic acids with one to four carbon atoms are not considered flavoring substances. The inclusion compounds of the present invention in particular do not contain acetic acid.

Cellulose is a linear polysaccharide built from beta-1.4-glycosidic linked residual glucose molecules (anhydroglucopyranose units). Because of the beta-position of the OH-group on the C-1 atom adjacent residual glucose molecules are rotated by 180°. The smallest recurring unit is referred to as a cellobiose. Cellulose is an important component of plant cell walls and is the most common and most important naturally occurring biopolymer. In plant fibers cellulose has a hierarchical structure. Thus within a plant fiber there will be numerous cellulose macrofibrils, which in turn comprise a number of microfibrils. The microfibrils of cellulose for their part comprise a number of elementary fibrils which for their part are in turn comprised of various cellulose chains (individual cellulose molecules).

Also according to the present invention, all references to any monomer of the polymer of general formula (I) indicates a structure as given in the brackets of formula (I). Preferably, the polymer of the inclusion compound of the present invention comprises monomers having a glycosidic bond at carbon atom position 1.

Further preferably,
(i) at least 70% of the monomers of the polymer of formula (I) are identical, preferably at least 80%, more preferably at least 83% and most preferably 90-98%, or
(ii) for at least 70% of the monomers of the polymer of formula (I) R1 is selected from —NH2 and —NH—CO—CH3, preferably for at least 80%, more preferably at least 83% and most preferably 90-98%.

It is to be noted that for option (ii) it is not required that all monomers have a glycosidic bond at the same position. However, it is preferred that the at least 70%, 80%, 83% and most preferably 90-98% monomers all have their respective glycosidic bond(s) at the same position. Also, it is not required that all at least 70%, 80%, 83% and most preferably 90-98% monomers are identically substituted at R1. Instead, the polymer can also contain a mixture of monomers wherein R1 is selected from —NH2 and —NH—CO—CH3.

As preferably, the monomers of the polymer of formula (I) are connected via bonds selected from alpha- or beta-glycosidic bonds, preferably selected from 1,3 glycosidic bonds, 1,4 glycosidic bonds and 1,6 glycosidic bonds, more preferably selected from alpha-1,4 glycosidic bonds, alpha-1,6 glycosidic bonds, beta-1,3 glycosidic bonds, beta-1,4 glycosidic bonds and beta-1,6 glycosidic bonds. The monomers of the polymer of formula (I) and particularly the at least 70%, 80%, 83% and most preferably 90-98% monomers can be connected by a mixture of such glycosidic bonds, such that some monomers are connected by one type of bonds and other monomers are connected by another type of bonds. Also, the polymer can be branched or unbranched, or can be a mixture of polymers, particularly a mixture of one or more branched and unbranched polymers.

Particularly, the polymer according to the invention preferably comprises simultaneously alpha-1,4 and alpha-1,6 glycosidic bonds, and/or
alpha-1,2, beta-1,4 and beta-1,6 glycosidic bonds, and/or
beta-1,3 and beta-1,4 glycosidic bonds, and/or
beta-1,3 and beta-1,6 glycosidic bonds.

The polymer is preferably selected from chitin, chitosan, dextran, mutan, glycogen, pullulan, amylopectin, curdlan, laminarin, chrysolaminarin, lentian, lichenin, pleuran, zymosan, schizophyllan, scleroglucan and beta-glucan, preferably chitosan, dextran, amylopectin, lichenin and yeast derived beta-glucan.

Chitin is one of the most frequent biopolymers on earth. By deacetylation, e.g. by treatment with sodium hydroxide solution or by enzymatic treatment, chitosan can be produced from chitin. Where the polymer has a degree of deacetylation of less than 50%, the polymer is called chitin; for higher degrees of deacetylation it is called chitosan. According to the present invention, the degree of deacetylation of chitosan preferably is 50-100%, more preferably 60-95% and most preferably 70-90%.

In the context of the present invention the term flavoring substances is used in the sense of Council Directive 88/388/EEC of 22 Jun. 1988, published in OJ L 184 of 15 Jul. 1988, p. 61. A flavoring substance according to this Directive is: "a defined chemical substance with flavoring properties which is obtained:

(i) by appropriate physical processes (including distillation and solvent extraction) or enzymatic or microbiological processes from material of vegetable or animal origin either in the raw state or after processing for human consumption by traditional food-preparation processes (including drying, torrefaction and fermentation), (ii) by chemical synthesis or isolated by chemical processes and which is chemically identical to a substance naturally present in material of vegetable or animal origin as described in (i), (iii) by chemical synthesis but which is not chemically identical to a substance naturally present in material of vegetable or animal origin as described in (i);"

Flavoring substances within the meaning of this definition occur in particular in the following extracts, essential oils, concretes, absolutes, resins, resinoids, balms or tinctures: amyris oil; angelica seed oil; angelica root oil; aniseed oil; valerian oil; basil oil; tree moss absolute; bay (myrcia) oil; motherwort or mugwort oil; benzoin resin; bergamot oil; beeswax absolute; birch tar oil; bitter almond oil; savory oil; buchu leaf oil; cabreuva oil; cade oil; calmus oil; camphor oil; cananga oil; cardamon seed oil; cascarilla oil; cassia oil; cassia absolute; castoreum absolute; cedar leaf oil; cedar wood oil; cistus oil; citronella oil; lemon oil; copaiba balsam; copaivabalsam oil; coriander oil; costus root oil; cumin oil; cypress oil; davana oil; dill weed oil; dill seed oil; oak moss absolute; elemi oil; tarragon oil; eucalyptus citriodora oil; eucalyptus oil; fennel oil; fir needle oil; galbanum oil; galbanum resin; geranium oil; grapefruit oil; guaiac wood oil; guaiac balsam; guaiac balsam oil; helichrysum absolute; helichrysum oil; ginger oil; iris root absolute; iris root oil; jasmin absolute; calmus oil; chamomile oil bleu; chamomile oil roman; carrot seed oil; cascarilla oil; pine needle oil; mint oil; carvi oil; labdanum oil; labdanum absolute; labdanum resin; lavandin absolute; lavandin oil; lavender absolute; lavender oil; lemongrass oil; lovage oil; lime oil distilled; lime oil pressed; Bursera penicillata (linaloe) oil; litsea-cubeba oil; bay laurel leaf oil; macis oil; marjoram oil; mandarin oil; massoirinde oil; mimosa absolute; ambrette seed oil; ambrette tincture; muskatelle salbei oil; nutmeg oil; myrrh absolute; myrrh oil; myrtle oil; carnation leaf oil; carnation blossom oil; neroli oil; olibanum absolute; olibanum oil; opopanax oil; orange blossom absolute; orange oil; oregano oil; palmarosa oil; patchouli oil; perilla oil; Peru balsam oil; parsley leaf oil; parsley seed oil; clove seed oil; peppermint oil; pepper oil; pimento oil; pine oil; poley oil; rose absolute; rose wood oil; rose oil; rosemary oil; sage oil; lavandin; sage oil Spanish; sandalwood oil; celery seed oil; lavender spike oil; star anis oil; styrax oil; tagetes oil; pine needle oil; tea-tree oil; turpentine oil; thyme oil; tolu balm; tonka absolute; tuberose absolute; vanilla extract; violet leaf absolute; verbena oil; vetiver oil; juniper berry oil; wine yeast oil; wormwood oil; wintergreen oil; ylang ylang oil; hyssop oil; civet absolute; cinnamon leaf oil; cinnamon bark oil.

Examples of flavoring substances to be used according to the invention are listed in sections 1 to 3 of Commission Decision of 23 Feb. 1999 on a register of flavoring substances used or intended for use in or on foodstuffs, drawn up in accordance with Regulation (EC) No. 2232/96 of the European Parliament and of the Council of 28 Oct. 1996 (1999/217/EC), published in Official Journal L 84/1 of 27 Mar. 1999 and as an appendix to the Ruling of the Commission of 18 Jul. 2000 amending Commission Decision 1999/217/EC on a register of flavoring substances used in or on foodstuffs (2000/489/EC), published in the OJ of the European Communities L 197/53 of 3 Aug. 2000.

In connection with the present invention lipophilic flavoring substances are preferably included in the inclusion compound of the invention. Lipophilic flavoring substances cannot be embedded in the compound simply by immersion, since they do not have the capacity to swell the polymer that has not been pre-swollen, i.e. they can only be embedded (included) in a pre-swollen polymer according to the invention. Methods according to the invention for producing such flavoring substance-included compounds according to the invention will be described further below.

In connection with the present text the term lipophilic flavoring substances means in particular flavoring substances with a log $P_{OW}$ of greater than 1.0.

The log $P_{OW}$ is the decadic logarithm of the distribution coefficient of a substance, here of the respective flavoring substance, concerning its distribution between 1-octanol and water. The coefficient is an expression of the ratio of the proportions of a substance in the two contacted phases of 1-Octanol (apolar) and water (polar) at the equilibrium. The coefficient $P_{OW}$ thus increases as the liposolubility rises. Accordingly compounds with a high log $P_{OW}$ are more lipophilic than those with a low log $P_{OW}$. Where in the context of the present text log $P_{OW}$ values are given, these refer to measurements at a temperature of 25° C.

So according to the present invention a flavoring substance according to the invention is preferred, wherein a or one, several or all of the included flavoring substance(s) has or have a log $P_{OW}$ of higher than 1.0. Further preference is for the or one, several or all of the included flavoring substances to have a log $P_{OW}$ of higher than 1.5, preferably of higher than 2.0, more preferably higher than 3.0 and particularly preferably of higher than 4.0.

Particular preference is for a flavoring substance according to the invention (as described above), wherein the total proportion of included flavoring substances with a log $P_{OW}$ of higher than 1.0 with reference to the total quantity of included flavoring substances is preferably at least 10%, preferably at least 30% and particularly preferably at least 50%.

The flavoring substance-included compounds according to the invention described above (and in particular the preferred embodiments of these described further below) have numerous advantages. Thus the included flavoring substances contained have particular protection from volatilization, oxidation and flavoring substance-flavoring substance reactions. The inclusion of the flavoring substances advantageously allows in particular protection from negative influences such as volatilization, evaporation, vaporescence, steam distillation, UV radiation, heat load, pressure and oxidation. Other advantages of the flavoring substance-included compounds according to the invention are that the polymer and particularly the preferred polymers, because of their widespread natural occurrence are available practically everywhere and in large quantities. Preferred polymers do not have a cariogenic effect, and/or is also suitable as a material for vegetarian nutrition, and/or has a neutral inherent taste, and/or has a regulatory effect on digestion and/or has further positive health benefits. For all the stated advantages the use of the polymer of formula (I) is very cost-effective. In combination with the method according to the invention (see below) the stabilization of flavoring substances can be advantageously achieved without the addition of antioxidants.

The flavoring substance-included compounds according to the invention allow a particularly good stabilization of the included flavoring substances. The flavoring substance-included compounds according to the invention can advantageously be stored for long periods without major flavoring substance loss. The flavoring profile of flavoring substance-included compounds according to the invention can therefore be kept constant over a long period.

In addition, high stability during food processing or preparation is guaranteed. The flavoring substance-included compounds according to the invention can therefore, by way of example, be used in heating, baking, roasting, frying, cooking, stewing, braising, grilling, steaming, pasteurizing, sterilizing, extruding, conching, sprinkling, interspersing, stirring-in, blending (wet/moist or dry), mixing, kneading, foaming, melting, solidifying, drying and dispersing of foodstuffs. In so doing with the flavoring substance-included compounds according to the invention in particular losses and undesired reactions of the (included) flavoring substances are reduced or even excluded. In addition, during storage and when the finished or semi-finished foodstuffs are for example kept in canteens, restaurants, catering establishments, at forwarding agencies, in warehouses and in supermarkets as well as at the consumer's, the flavoring substance-included compounds according to the invention can contribute towards the stabilization of the flavoring substances. Surprisingly, the flavoring substance-included compounds according to the invention, despite their high stability, in particular during consumption, enable the release of the included flavoring substances, so that these can be clearly perceived by the consumer. The flavoring substance-included compounds according to the invention are thus particular suitable for "delivery on demand". The flavoring substance-included compounds according to the invention can also be used to extend the flavoring substance release, wherein the use in chewing gum is of particularly high significance. In addition, a flavoring substance-included compound according to the invention of the included flavoring substances can be used in food processing in a targeted manner in order to flavor the food or to mask unpleasant-tasting substances. Preparations or semi-finished goods according to the invention intended for nourishment or pleasure are described below.

A further advantage of flavoring substance-included compounds according to the invention is that their encapsulation medium (polymer of formula (I)) at least as a rule does not have any cariogenic effect. The use of the flavoring substance-included compounds according to the invention is therefore particularly recommended in chewing gum, toothpaste and other oral care products, tooth-friendly caramel sweets, sugar-coated pills, pastilles and other applications in particular for freshening the breath and increasing or maintaining oral hygiene.

In addition flavoring substances according to the invention are advantageously suitable as a medium or component of a medium for stimulating bowel function and thus for maintaining intestinal health and preventing (intestinal) diseases. Because of their preferably low calorific value the flavoring substance-included compounds according to the invention also make no contribution to the body's energy supply and because of their additional satiation-controlling and fat elimination promoting properties they can therefore help to reduce or delay the onset or advance of obesity and thus the disease associated with this. The flavoring substance-included compounds according to the invention (incorporated into foodstuffs) can contribute to maintaining a healthy body and increasing a sense of wellbeing. The flavoring substance-included compounds according to the invention can be used in a targeted manner to prevent, fight or moderate the diseases mentioned and others. The flavoring substance-included compounds according to the invention are advantageously at most absorbed by the body in small quantities; preferably the polymer is chosen such that the compound does not have to be metabolized in an insulin-dependent manner, so that they can also in particular be used in foodstuffs for diabetics. The flavoring substance-included compounds according to the invention can control (in particular slow down) the absorption of glucose, wherein a rapid and strong increase in the glucose concentration can be counteracted. It is currently believed that this control is the result of the water binding properties of the polymer, whereby the viscosity of the bolus in the digestive tract is increased and the absorption of glucose is accordingly slowed. In addition it is possible that polymer-glucose interactions take place which can likewise delay the absorption of glucose. This fact can also contribute to a feeling of wellbeing in healthy persons, in that, for example, a drop in energy levels as a result of an exaggerated insulin response to very rapidly absorbed carbohydrate can be curtailed, as well as a reduction in cravings for foods, which can occur because of over-control of insulin excretion and the resultant excessively low blood glucose concentration that occurs.

The lipophilic flavoring substances preferably used in the context of the present invention and thus preferably included in a flavoring substance-included compound according to the invention belong to various chemical groups, such as for example:

the group comprising hydrocarbons, such as for example 3-carene; α-pinene; β-pinene; α-terpinene; γ-terpinene; p-cymol; bisabolene; camphene; caryophyllene; cedrene; farnesene; limonene; longifolene; myrcene; ocimene; valencene; (E,Z)-1,3,5-undecatrien;

the group comprising aliphatic alcohols, such as for example: hexanol; octanol; 3-octanol; 2,6-dimethylheptanol; 2-methyl-2-heptanol; 2-methyl-2-octanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

the group comprising aliphatic aldehydes and the acetals thereof such as for example: hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanal diethylacetal; 1,1-dimethoxy-2,2,5-trimethyl-4-hexene;

the group comprising aliphatic ketones and oximes thereof, such as for example: 2-heptanone; 2-octanone; 3-octanone; 2-nonanone; 5-methyl-3-heptanone; 5-methyl-3-heptanone oxime; 2,4,4,7-tetramethyl-6-octen-3-one; aliphatic sulfur-containing compounds such as for example: 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthen-8-thiol;

the group comprising aliphatic nitriles, such as for example: 2-nonenoic acid nitrile; 2-tridecenoic acid nitrile; 2,12-tridecadienoic acid nitrile; 3,7-dimethyl-2,6-octadienoic acid nitrile; 3,7-dimethyl-6-octenoic acid nitrile;

the group comprising aliphatic carboxylic acids esters such as for example: (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl-2-methyl pentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate;

the group comprising acyclic terpene alcohols such as for example: citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-1-ol; and the formates, acetates, propionates, isobutyrates, butyrates, isovalerates, pentanoates, hexanoates, crotonates, tiglinates, 3-methyl-2-butenoates thereof;

the group comprising acyclic terpene aldehydes and ketones such as for example: geranial; neral; citronellal; 7-hydroxy-3,7-dimethyloctanal; 7-methoxy-3,7-dimethyloctanal; 2,6,10-trimethyl-9-undecenal; geranyl acetone; and the dimethyl and diethyl acetals of geranial, neral, 7-hydroxy-3,7-dimethyloctanal;

the group comprising cyclic terpene alcohols such as for example: menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and the formates, acetates, propionates, isobutyrates, butyrates, isovalerates, pentanoates, hexanoates, crotonates, tiglinates, 3-methyl-2-butenoates thereof;

the group comprising cyclic terpene aldehydes and ketones such as for example: menthone; isomenthone; 8-mercaptomenthan-3-one; carvone; camphor; fenchone; alpha-ionone; beta-ionone; alpha-n-methyl ionone; beta-n-methyl ionone; alpha-isomethyl ionone; beta-isomethyl ionone; alpha-irone; alpha-damascone; beta-damascone; beta-damascenone; delta-damascone; gamma-damascone; 1-(2,4,4-trimethyl-2-cyclohexen-1-yl)-2-buten-1-one; 1,3,4,6,7,8a-hexahydro-1,1,5,5-tetramethyl-2H-2,4-a-methanonaphthalen-8(5H-)-one; nootkatone; dihydronootkatone; alpha-sinensal; beta-sinensal;

the group comprising cyclic alcohols such as for example: 4-tert.-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

the group comprising cycloaliphatic alcohols such as for example: alpha-3,3-trimethylcyclohexylmethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

the group comprising esters of cycloaliphatic carboxylic acids such as for example: allyl-3-cyclohexyl propionate; allylcyclohexyl oxyacetate; methyldihydrojasmonate; methyl jasmonate; methyl-2-hexyl-3-oxocyclopentane carboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane-2-acetate;

the group comprising aromatic hydrocarbons, such as for example styrene and diphenyl-methane;

the group comprising araliphatic alcohols such as for example: benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenyl ethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

the group comprising esters of araliphatic alcohols and aliphatic carboxylic acids such as for example: benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethylacetate; alpha-trichloromethylbenzyl acetate; alpha,alpha-dimethylphenylethyl acetate; alpha,alpha-dimethylphenylethyl butyrate; cinnamyl acetate; 2-phenoxyethyl isobutyrate; 4-methoxybenzyl acetate; aralipathic ethers such as for example: 2-phenylethyl methyl ether; 2-phenyl ethyl isoamyl ether; 2-phenyl ethyl-1-ethoxyethyl ether; phenylacetaldehyde dimethylacetal; phenylacetaldehyde diethylacetal; hydratropaldehyde dimethylacetal; phenylacetaldehyde glycerol acetal;

the group comprising aromatic and araliphatic aldehydes such as for example: benzaldehyde; phenylacetaldehyde; 3-phenylpropanal; hydratropaldehyde; 4-methylbenzaldehyde; 4-methylphenylacetaldehyde; 3-(4-ethylphenyl)2,2-dimethylpropanal; 2-methyl-3-(4-isopropylphenyl)propanal; 2-methyl-3-(4-tert.-butylphenyl)propanal; 3-(4-tert.-butylphenyl)propanal; cinnamaldehyde; alpha-butylcinnamaldehyde; alpha-amylcinnamaldehyde; alpha-hexylcinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

the group comprising aromatic and araliphatic ketones such as for example: acetophenone; 4-methylacetophenone; 4-methoxyacetophenone; 4-tert.-butyl-2,6-dimethylacetophenone; 4-phenyl-2-butanone; 4-(4-hydroxyphenyl)-2-butanone; 1-(2-naphthalenyl)ethanol; benzophenone;

the group comprising aromatic and araliphatic carboxylic acids and the esters thereof such as for example: benzoic acid; phenylacetic acid; methyl benzoate; ethyl benzoate; hexyl benzoate; benzyl benzoate; methylphenyl acetate; ethylphenyl acetate; geranylphenyl acetate; phenylethylphenyl acetate; methyl cinnamate; ethyl cinnamate; benzyl cinnamate; phenylethyl cinnamate; cinnamyl cinnamate; allyl phenoxy acetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6-dimethylbenzoate; ethyl-3-phenylglycidate; ethyl-3-methyl-3-phenyl glycidate;

the group comprising nitrogenous aromatic compounds such as for example: 2,4,6-trinitro-1,3-dimethyl-5-tert.-butylbenzene; 3,5-dinitro-2,6-dimethyl-4-tert.-butyl acetophenone; cinnamonitrile; 5-phenyl-3-methyl-2-pentenoic acidnitrile; 5-phenyl-3-methylpentanoic acid nitrile; methyl anthranilate; methyl-N-methyl anthranilate; Schiff bases of methyl anthranilate with 7-hydroxy-3,7-dimethyloctanal, 2-methyl-3-(4-tert.-butylphenyl)propanal or 2,4-dimethyl-3-cyclohexenecarbaldehyde; 6-isopropyl quinoline; 6-isobutyl quinoline; 6-sec.-butyl quinoline; indole; skatole; 2-methoxy-3-isopropylpyrazine; 2-isobutyl-3-methoxypyrazine;

the group comprising phenols, phenyl ethers and phenyl esters such as for example: estragole; anethole; eugenol; eugenyl methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresyl phenyl acetate;

the group comprising heterocyclic compounds such as for example: 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

the group comprising lactones such as for example: 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene 1,12-dodecanedioate; ethylene 1,13-tridecanedioate; coumarin; 2,3-dihydrocoumarin; octahydrocoumarin.

The lipophilic flavoring substances with a log $P_{OW}$ of higher than 1.0 preferably used in the context of the present invention or preferably included in the compounds are preferably selected from the group comprising:
acetophenone, allyl capronate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymol, damascone, decalactone, dihydrocoumarin, dimethyl anthranilate, dimethyl anthranilate, dodecalactone, ethoxyethyl acetate, ethylbutyric acid, ethyl butyrate, ethyl caprinate, ethyl capronate, ethyl crotonate, ethyl furaneol, ethyl guajacol, ethyl isobutyrate, ethyl isovalerate, ethyl lactate, ethyl methyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. hedione), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl capronate, trans-2-hexenyl capronate, cis-3-hexenyl formate, cis-2-hexyl acetate, cis-3-hexyl acetate, trans-2-hexyl acetate, cis-3-hexyl formate, para-hydroxy benzyl acetone, isoamyl alcohol, isoamyl isovalerate, isobutyl butyrate, isobutyraldehyde, isoeugenol methyl ether, isopropylmethylthiazole, lauric acid, levulinic acid, linalool, linalool oxide, linalyl acetate, menthol, menthofuran, methyl anthranilate, methylbutanol, methylbutyric acid, 2-methylbutyl acetate, methyl capronate, methyl cinnamate, 5-methyl furfural, 3,2,2-methyl cyclopentenolone, 6,5,2-methyl heptenone, methyl dihydrojasmonate, methyl jasmonate, 2-methyl methyl butyrate, 2-methyl-2-pentenoic acid, methylthiobutyrate, 3,1-methylthiohexanol, 3-methylthiohexyl acetate, nerol, neryl acetate, trans,trans,2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethyl isovalerate, piperonal, propionaldehyde, propyl butyrate, pulegone, pulegol, sinensal, sulfurol, terpinene, terpineol, terpinolene, 8,3-thiomenthanone, 4,4,2-thiomethyl pentanone, thymol, delta-undecalactone, gamma-undecalactone, valencene, valeric acid, vanillin, acetoin, ethyl vanillin, ethyl vanillin isobutyrate (=3-ethoxy-4-isobutyryloxybenzaldehyde), 2,5-dimethyl-4-hydroxy-3(2H)-furanone and the derivatives thereof (in this case preferably homo-furaneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (in this case preferably ethyl maltol), coumarin and coumarin derivatives, gamma-lactones (in this case preferably gamma-undecalactone, gamma-nonalactone, gamma-decalactone), delta-lactones (in this case preferably 4-methyl delta decalactone, massoia lactone, delta decalactone, tuberose lactone), methyl sorbate, divanillin, 4-hydroxy-2(or 5)-ethyl-5 (or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methylbutyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenyl glycidate, ethyl-2- trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulfide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, mercapto-3-methyl-1-butanol, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guajacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and further stereoisomers, enantiomers, positional isomers, diastereomers, cis/trans-isomers or epimers (not expressly mentioned) of these substances.

Flavoring substances to be used according to the invention can in the context of the present invention also be used in combination with one or more flavoring solvent(s). Here use is preferably made of solvents suitable for human consumption. Preferred flavoring solvents are in this respect ethanol, fatty oils, such as cooking oils and in particular vegetable oils such as for example borage oil, thistle oil, groundnut oil, hazelnut oil, coconut oil, pumpkin seed oil, linseed oil, maize germ oil, macadamia nut oil, almond oil, olive oil, pecan nut oil, pistachio kernel oil, rapeseed oil, rice germ oil, sesame seed oil, Soya oil, sunflower oil, walnut oil or wheat germ oil, fractionated coconut oils, which mainly have fatty acid residues with a length of between six and eight carbon atoms (C6- to C8-fatty acids), propylene glycol, diacetine (glycerine diacetate), triacetine (glycerine triacetat), benzyl alcohol, triethyl citrate, ethyl lactate, isopropanol and glycerine. According to a preferred embodiment the flavoring substances to be used according to the invention are mixed with one or more of the abovementioned flavoring solvents and then fed into the method according the invention. The method according to the invention is described further below.

Particularly preferred the flavoring substance is selected from the group consisting of carbohydrates, e.g. 3-carene; α-pinene; β-pinene; α-terpinene; γ-terpinene; p-cymol; bis-abolene; camphene; caryophyllene; cedrene; farnesene; limonene; longifolene; myrcene; ocimene; valencene; (E,Z)-1,3,5-undecatrien.

A flavoring substance according to the invention, in particular a flavoring substance-included compound designated above as preferred, preferably comprises or consists of
(i) a total of 75 to 99 wt %, preferably 75 to 95 wt % polymers of formula (I), wherein preferably the polymers of formula (I) is a single type of polymer of formula (I), and particularly preferably one of the polymers mentioned above as being preferred, and
(ii) a total of 1 to 25 wt %, preferably 5 to 25 wt % included flavoring substances, provided that, as throughout in connection with the present invention, the included flavoring substances are not alkanoic acids with between 1 and 4 C-atoms.

Amylopectin preferably is obtained from waxy maize starch ("Wachsmaisstärke") or from starches with higher content of amylose. Starches are fractionated and amylose is separated by techniques known to the person skilled in the art. Preferably, amylopectin used according to the invention has a content of amylose of less than 5 wt.-%, more preferably less than 3 wt.-%, more preferably less than 1 wt.-% and even more preferably less than 0.5 wt.-%.

Chitosan preferably can be obtained from shells of crustaceae, particularly from those of shrimp. The production of chitosan is known to the skilled person.

Lichenine is contained in lichens and mosses and can be obtained according to methods known in the art. According to the invention, lichenin is preferably obtained from oat or barley. Other sources, for example, are wheat and rye.

Beta-glucan of yeast can be obtained from *saccharomyces cerevisiae* or torula (*Candida torula*). The yeast preferably is autolysed, such that interior cell constituents are disintegrated while parts of or the whole cell wall remain intact. The autolysed cell detritus preferably is deproteinated, such that the protein content preferably is 0.1-15 wt.-%, more preferably 0.5-12 wt.-% and even more preferably 1-10 wt.-%. Protein content is done according to the Kjeldahl nitrogen determination scheme, corrected by a factor of 6.25.

In particular for the application according to the invention in foodstuffs experience has shown that it is advantageous if the polymer of formula (I) has short fiber lengths (for preparations and semi-finished goods intended for nourishment or pleasure according to the invention containing flavoring substance according to the invention see below). The fiber length of the polymers in flavoring substance-included compounds according to the invention is preferably 0.1 to 5,000 µm, more preferably 1.0 to 500 µm, and particularly preferably 5.0 to 150 µm. The fiber thickness is preferably 0.5 to 80 µm, more preferably 1.0 to 50 µm and particularly preferably 1.0 to 30 µm.

Accordingly a flavoring substance according to the invention, in particular a flavoring substance-included compound designated above as preferred is particularly preferred wherein the polymer of formula (I) has a fiber length of 0.1 to 5,000 µm, preferably of 1.0 to 500 µm, and particularly preferably of 5.0 to 150 µm.

Preference is for a flavoring substance according to the invention, wherein the polymer or formula (I) has a fiber thickness of 0.5 to 80 µm, preferably of 1.0 to 50 µm, particularly preferably of 1.0 to 30 µm.

The setting of the polymer fiber size, i.e. the fiber length and thickness, can take place before or after inclusion of the flavoring substance in the compound, i.e. before or after the execution of a method according to the invention (for the producing method according to the invention see below).

A further aspect of the present invention concerns a mixture, comprising or consisting of
(i+ii) flavoring substance-included compound(s) according to the invention and
(iv) water.

A mixture according to the invention (as described above) preferably comprises or consists of
(i+ii) 85 to 99.9 wt % flavoring substance-included compound according to the invention (as described above) and
(iv) 0.1 to 15 wt %, preferably 1 to 10 wt % water,
in each case in relation to the total weight of the mixture.

As usual in connection with the present invention, the 85-99.9 wt % of flavoring substance-included compound can be made of two or more compounds, wherein said compounds can differ e.g. in the respective flavoring substance and/or the polymer/polymer mixtures of the compounds.

Manufacture of mixtures according to the invention having a water content of 0.1-15 wt %, more preferred of 1-10 wt %, had not been possible before the date of the present invention, because mixtures of polymers of formula (I) with lipophilic flavoring substances in watery or dry conditions did not result in stable inclusion compounds and mixtures. Under dry conditions, the flavoring substances could not insert into the polymers of formula (I) due to the low distance between polymer molecules. Under watery conditions, inclusion compounds could theoretically be produced for fractions of seconds, but the compounds disintegrate rapidly due to the presence of water. The compounds and mixtures according to the invention, on the other hand, are stable for long periods, particularly longer than 1 second. Preferably, they are stable for more than 1 month, even more preferably for more than 1 year. Preferably, they are stable for 1 second to 20 years or longer, more preferably 1 month up to 10 years and most preferably between 1 year and 10 years. The determination of the stability in the range of seconds can be carried out by NMR methods. Procedures are known to persons skilled in the art from amylose inclusion compounds and cyclodextrin inclusion compounds. Stability over month or years can be carried out by determination of the included flavoring substance content as described below at the time of the beginning of the stability test I (stab_t0). Then a sample of the inclusion compound according to the invention is placed in an open beaker and stored at 20° C. at a relative humidity of 50% for the certain time t. Then again the included flavoring substance content is determined and referred to as I (stab_t). The inclusion compound according to the invention is referred to be stable, if the quotient of I (stab_t)/I(stab_t0) is 0.7 to 1, preferably 0.8 to 1, preferably 0.9 to 1 and most preferably 0.95 to 1.

Low stability can be demonstrated by the observation that compounds and mixtures (not according to the invention) disintegrate upon drying when taken from a watery environment. Potentially, some aroma substances remain inside the disintegrated mass, but these aroma substances are not included in the polymer(s) of formula (I); instead, they are dispersed as fine droplets or surface film. Such masses therefore cannot qualify as inclusion compounds.

A next aspect of the present invention concerns a method for producing a flavoring substance-included compound, comprising the following steps:
(I) inclusion of one or more primary swelling agent(s) (A) in one or more polymers of formula (I), particularly one or more of the above preferred polymers;
(III) partial or complete replacement of included swelling agents by one, two, three, four or more flavoring substances, providing that the flavoring substances are not alkanoic acids with between 1 and 4 C-atoms,
so that the flavoring substances are included in the polymer(s).

For (a) flavoring substances and (b) polymers to be used by preference according to the invention that stated above applies by analogy.

According to a preferred embodiment of this method the present invention concerns a method for producing a flavoring substance-included compound (as described above), wherein swelling agent included in step (III) is only partially replaced. Here the method according to the invention preferably also contains the following step:
(IV) removal of included swelling agents that have not been replaced by flavoring substances.

Further preference is for a method according to the invention for producing a flavoring substance-included compound (as described above), wherein in step (III) a proportion of 50% or more, preferably 80% or more, with particular preference for 90% or more, and with quite particular preference for 99% or more of the flavoring substances used is included in the polymer(s). A person skilled in the art will be able to infer from the statements in the present description and the examples given below the necessary criteria for achieving these values.

Particular preference is for a method according to the invention for producing a flavoring substance-included compound (as described above), which also contains the following step:
(II) partial or complete replacement of included primary swelling agents (A) by one or more secondary swelling agent(s) (B), so that this (these) is (are) included in the polymer,
and then optionally the step:
(IIb) partial or complete replacement of secondary swelling agents (B) included in the polymer by one or more further secondary swelling agent(s) (B)
and repetition of this step as necessary.

In connection with the present invention, the term "swelling agent" designates the substances that can be embedded in the molecular structure of the polymer(s)—that is to say "included" within the meaning of the above definition of inclusion compounds—, with the exception of the flavoring substances to be used in the method according to the invention; these can indeed likewise included in be included in the polymer, but in the context of the present text are not referred to as "swelling agents".

In the context of the present text the term "primary swelling agent" designates substances which are able to embed themselves in the molecular structure of non-pre-swollen polymers of formula (I). Again, as always in accordance with the present invention, the "polymer of formula (I)" does not include celluloses and amylose. The ability of the primary swelling agents to embed themselves in the polymer of formula (I), is based on the fact that they infiltrate the polymer structures and are able there to release hydrogen bridge bonds between the OH groups of the monomer molecules. In the context of the present text the embedding (inclusion) of the primary swelling agent is also designated as the "first swelling" of the polymer. Primary swelling agents (A) preferred according to the invention are mentioned further below.

In the context of the present text, the term "secondary swelling agent" designates substances which, if included in polymer, in step (III) can be replaced by the flavoring substances to be used or included. This characteristic stems from the fact that the secondary swelling agents have the advantageous ability to mix in a very broad range of concentrations, without phase separation, with the said flavoring substances. Furthermore, the secondary swelling agents advantageously maintain the swollen state of the polymer and allow a better distribution of the flavoring substances and their positioning between the polymer chains. Secondary swelling agents (B) preferred according to the invention are mentioned further below. In the context of the present text, the step of including secondary swelling agents (B) in (pre-swollen) polymer is designated as the "second swelling" of the polymer.

According to the above statements in the context of a preferred method according to the invention for producing a flavoring substance-included compounds first the polymer(s) is/are (pre-) swollen with one or more primary swelling agent(s) (A), i.e. the primary swelling agents (A) are included in the polymer (step (I)). Then the included primary swelling agents (A) may preferably be partially or completely replaced by secondary swelling agents (B), whereby in turn the secondary swelling agents (B) are included in the polymer(s) (step (II)). Optionally the included secondary swelling agents (B) are in turn partially or completely replaced by further secondary swelling agents (B) (step (IIb)). In a next step (III) the included swelling agents, thus included primary swelling agents (A) and/or included secondary swelling agents (B), are partially or completely, preferably as far as possible completely, replaced by flavoring substances to be used according to the invention, so that these are included in the polymer. Where in step (III) included swelling agents are only partially replaced by flavoring substances, a further step (IV) preferably takes place, in which the included swelling agents not replaced by flavoring substances, e.g. remaining quantities of included primary swelling agents (A) and/or included secondary swelling agents (B), are removed.

Preferably in a method according to the invention for producing a flavoring substance-included compound, particularly in a method designated as preferred, one, several or all of the primary swelling agent(s) (A) is (are) selected from the group (a1) consisting of water, glycerine, propylene glycol, formic acid, ammonia and mixtures of two or more of these, or the group (a2) consisting of acetic acid.

Where in the method according to the invention primary swelling agents (A) from group (a1) are used, i.e. are included in the polymer of formula (I), these are preferably in the context of a step (II) (as described above) replaced by secondary swelling agents (B).

Where in the method according to the invention primary swelling agents (A) from group (a2) are used, i.e. are included in the polymer of formula (I), these are preferably either first replaced by secondary swelling agents (B) (see step (II)) or directly by one or more flavoring substances (as described above; see step (III)). Primary swelling agents (A) from group (a2) are suitable in particular advantageously well-suited for being replaced in the included state by the flavoring substances to be used in accordance with the invention, so that the flavoring substances are included in the compound; primary swelling agents from group (a2) are thus simultaneously also secondary swelling agents; these are also referred to as universal swelling agents.

Accordingly the present invention preferably concerns a method for producing a flavoring substance-included compound (as described above), wherein the method includes a first step (II) (as described above) and the or one, several or all the primary swelling agent(s) (A) to be replaced is (are) selected from the group (a1) consisting of water, glycerine, propylene glycol, formic acid, ammonia and mixtures of two or more of these or the method does not include a step (II) as defined above and the or one of the primary swelling agent(s) (A) is selected from the group (a2) consisting of acetic acid (universal swelling agent).

Preferably the or one, several or all of the secondary swelling agent(s) (B) in a method according to the invention for producing a flavoring substance-included compound (as described above) is (are) selected from the group comprising ethanol, propanol, butanol, butyric acid, propionic acid and mixtures thereof; preferably from the group comprising ethanol and propanol.

In step (I), i.e. during the first swelling a single primary swelling agent (A) from group (a1), a mixture of different primary swelling agents (A) from group (a1), a single primary swelling agent from group (a2), a mixture of one or more primary swelling agent(s) (A) from group (a1) and a primary swelling agent from group (a2) or a mixture of one or more primary swelling agent(s) (A) from groups (a1) and/or (a2) and one or more secondary swelling agents (B), preferably one or more swelling agents designated above as preferred, are preferably used.

According to a further embodiment the present invention thus preferably concerns a method according to the invention as described above for producing a flavoring substance-included compound, wherein in step (I) apart from one or more primary swelling agent(s) (A) additionally one or more secondary swelling agent(s) (B) is (are) used. According to this embodiment the primary and secondary swelling agents are both added in step (I), with the first swelling (as described above) then taking place routinely by the primary swelling agent (A), i.e. before secondary swelling agents are included in the polymer(s), one or more of the primary swelling agent(s) (A) used is (are) included in the polymer, in order to thereby pre-swell the polymer part.

The inclusion or one or more swelling agent(s) in compounds in the context of an inclusion step according to the invention step (I), step (II) or step (IIb) preferably takes place by direct mixing of the swelling agent(s) to be included and the polymer or indirectly by vaporization or condensation of the swelling agent(s) onto the polymer. Details of these methods are described further below.

For some polymers of formula (I) it is possible that some primary swelling agents (a1) or (a2) can lead to a solution of the polymer. According to the invention, such swelling agents are only used under conditions in which the polymer is not significantly dissolved. The dissolved fraction of the polymer in step (I) according to the invention is less than 90 wt %, preferably less than 70 wt %, more preferably is 0-50 wt %, more preferably 0-30 wt %, even more preferably 0-10 wt %, yet more preferably 0-5 wt % and particularly preferred 0-1 wt %. According to a preferred teaching of the invention, 0% of the polymer(s) of formula (I) are dissolved in step (I). A high content of dissolved polymer of formula (I) would impart formation of inclusion compounds according to the invention.

Particularly preferred is a method in which in step (I) a mixture of one or more primary swelling agents (A) of group (a1) and one or more swelling agents of group (B) is used. The weight ratio of the total of primary swelling agents (A) of group (a1) to the total of secondary swelling agents (B) is preferably 1:9 to 9:1, preferably 1:1 to 1:9, particularly preferred 1:1 to 1:4. For these ratios, it is particularly preferred to use water as primary swelling agent (A) of group (a1) and ethanol as secondary swelling agent (B).

For limiting the amount of dissolved polymer(s) of formula (I), the skilled person can use a number of techniques. For example, temperature can be kept sufficiently low to limit dissolution of lichenin, or the pH may be optimized in view of the respective polymer(s) of formula (I). For example, the pH used to swell glucan can be low, preferably between 5 and 7.5, while for chitosan the polymer can be high, preferably between 6.5 and 8. Most preferably, the skilled person will choose a swelling agent or swelling agent mixture which suppresses dissolution of the polymer of formula (I).

The swelling agents (A) and/or (B) to be included which are used are volatile, with particular preference for slightly volatile, substances.

The method according to the invention for producing a flavoring substance-included compound (as described above), is preferably a method wherein the or one, several or all of the primary swelling agent(s) (A) and/or secondary swelling agents (B) used in steps (I), (II), or (IIb) has (have)

a higher vapor pressure than the, or one, several or all of the flavoring substance(s) used in step (III).

More preferably, a method according to the invention is a method for producing a flavoring substance-included compound (as described above), wherein in a step ((II) or (IIb) secondary swelling agents (B) are used, which have a higher vapor pressure than the or one, several or all of the flavoring substance(s) used in step (III).

Greater preference is for a method for producing a flavoring substance-included compound as described above, wherein a, or one, several or all of the flavoring substance(s) used in step (III) has (have) a log $P_{OW}$ of greater than 1.0, preferably of greater than 1.5, preferably greater than 2.0, more preferably greater than 3 and particularly preferably greater than 4.

Particular preference is for a method for producing a flavoring substance-included compound (as described above), wherein the total proportion of the flavoring substances used in step (III) with a log $P_{OW}$ of greater than 1.0 in relation to the total quantity of the flavoring substances used in step (III) is preferably at least 10%, more preferably at least 30% and especially preferably at least 50%.

The mixing of (primary or secondary or possibly primary and secondary) swelling agents and (possibly pre-swollen) polymer(s) in step (I), (II) or (IIb) is preferably carried as a function of the proportions of swelling agents used with suitable equipment. When using relatively small quantities of swelling agent (swelling agent content in the swelling agent/polymer mixture approximately 20 to 70 wt %) the mixtures generally have the characteristics of solids and are therefore preferably mixed with known mixers such as for example plough share mixers and drum mixers. Average quantities of swelling agents (swelling agent content in the polymer-swelling agent mixture approximately 70-80 wt %) result in a pasty consistency of the mixture and are therefore preferably processed with equipment that is able to handle high viscosities, such as kneaders and extruders. Very high quantities of swelling agents (swelling agent content in the polymer-swelling agent mixture approximately 80 wt % and above) are preferably processed in simple vessels such as for example containers, tanks and impeller type mixers if necessary with the possibility of heating. Here the stated swelling agent contents serve as guide values only, since the origin and possibly any pre-treatment of the polymer(s) have a considerable effect on the structural form and the viscosity and as a result also on the selection of the equipment to be used. A person skilled in the art will be aware of the criteria for selection of the corresponding equipment.

The swelling time, i.e. the duration of mixing in an inclusion step according to the invention step (I), step (II) or step (IIb) will be determined by a person skilled in the art as a function of the polymers used (for preferred polymers to be used see above), the swelling agent(s) (for preferred swelling agents to be used see above), the swelling agent concentrations and the swelling method selected. The necessary duration of swelling in each case (i.e. the duration for inclusion of the swelling agent) is highly dependent upon the temperature. As a rule an increase in temperature leads to an acceleration in swelling, e.g. the inclusion of the desired swelling agents. At low temperatures (e.g. at ambient temperature) for sufficient swelling of the polymers experience shows that approximately 12 to 36 hours are required, while at high temperatures (e.g. 70 to 280° C.) generally only a few minutes (approximately 2 to 60 minutes) are necessary. Other temperature-time regimes can be easily worked out by a person skilled in the art.

Preferably the swelling in the context of an inclusion step according to the invention step (I), step (II) or step (IIb) takes place at atmospheric pressure and at the boiling temperature of the swelling agent(s) to be included or at a temperature of up to 20° C. below this. Swelling under a pressure burden is in many cases preferably carried out in order to increase the boiling temperature of the swelling agent and reduce the swelling time. Further preference is often for the use of a pressure drop, wherein swelling agent and polymers are first exposed to a high pressure burden and then the pressure is suddenly dropped. Furthermore, following an inclusion step according to the invention step (I), in particular when water is used as a primary swelling agent (A), freezing of the swelling agent preferably takes place. As a result of the increase in volume of the swelling agent (in particular of water) during freezing the polymers fibers are dilated by the included swelling agent and an ensuing swelling, i.e. a subsequent inclusion, is thereby facilitated. In addition the swelling process in the context of an inclusion step according to the invention (step (I), step (II) or step (IIb)) is preferably supported by mechanical aids such as stirrers, mixers, dispersers or mills.

As described above, the inclusion of one or more swelling agents in the polymer in the context of an inclusion step according to the invention (step (I), step (II) or step (IIb)) need not take place by mixing (as described above), but can take place indirectly by vaporization or condensation of the swelling agent(s) onto the polymers.

For vaporization the (possibly pre-swollen) polymer is preferably treated with a gas mixture enriched with the swelling agent to be included. The gas mixture preferably comprises steam given off by the boiling swelling agent to be included or a boiling swelling agent mixture. Thus the (possibly pre-swollen) polymers, by way of example embedded in cloths, filters or sieves are stored above the boiling swelling agent or the boiling swelling agent mixture. Alternatively the (possibly pre-swollen) polymer(s) is preferably treated in distillation apparatus or in fluidized beds with the swelling agent or a swelling agent mixture to be included in the steam.

Here condensation of the steam onto the fibers or onto cold parts of the apparatus can take place, so that the swelling preferably takes place in a combined manner via a swelling agent from the gas phase and a swelling agent from a liquid phase. Here polymer-swelling agent mixtures with a swelling agent content of approximately 40 to 70 wt % are preferably used.

Furthermore swelling agent can be included in the (possibly pre-swollen) polymer by combined vaporization and condensation. For this advantageously relatively small quantities of the swelling agent to be included are actually sufficient (swelling agent content in the polymer-swelling agent mixture of approximately 20 to 70 wt %, preferably 50 to 70 wt %). For this purpose the swelling agent and polymer are preferably heated in a sealed vessel and then cooled, so that the swelling takes place through a combination of both the gas phase and the condensation of the swelling agent.

For the execution of the method according to the invention for the first swelling (step (I)) preferably a minimum quantity of primary swelling agent (A) should be used. This minimum quantity of primary swelling agent (A) is particularly advantageous or, depending on how the method is designed, essential in order that the primary swelling agents (A) can take on the function of the (first) swelling. Below this minimum quantity there is a danger that this will not swell or not sufficiently swell the polymer and in some circumstances even bring about or promote the opposite of swelling, i.e. a depletion, which in particular in the primary swelling agent (A) of water is the case. The quantity of primary swelling agent (A) to be used is as a rule at least 15 wt %, preferably at least 20 wt %, in relation to the total weight of primary swelling agents (A) and polymer in the starting mixture ($M_I$). Particular preference is therefore for a method for producing a flavoring substance-included compound as described above, wherein in step (I) prior to inclusion of the swelling agent the proportion of primary swelling agents (A) in a starting mixture ($M_I$) comprising polymer(s), primary swelling agent (A) is at least 20 wt %, preferably at least 30 wt %, preferably at least 40 wt %, in relation to the total weight of polymers and primary swelling agent (A) in the starting mixture ($M_I$). In order to achieve a higher flavoring substance loading in the product, i.e. of the flavoring substance-included compound, it is as a rule advantageous to use at least 40 wt % of primary swelling agents (A).

Depending in the nature, origin and prior treatment of the polymer to be used according to the invention the water content of this may vary at the start of the method according to the invention.

Since in the context of the present invention water constitutes a primary swelling agent (A) from group (a1) (as described above), the water content that may at the start of step (I) of the method according to the invention (still) be in the polymer is counted towards the quantity of primary swelling agents (A), in particular with regard to the stated quantities of the swelling agent proportions in the starting mixtures. Where in the context of the present text, therefore, the water content of the polymer is mentioned, according to the nature, origin, prior treatment of the polymer and design of the method according to the invention and the swelling agents used therein, this will include both water which is used as a primary swelling agent (A) within the meaning of the present invention, and water which results from the polymer to be used according to the invention at the start of the method according to the invention.

In the context of the present invention the term "starting mixture ($M_I$)" designates a mixture that exists at the start of the step (I) according to the invention (inclusion of one or more primary swelling agent(s) (A) in polymer), which includes polymer(s) to be used according to the invention, primary swelling agent (A) to be included in the polymer.

The method according to the invention can also be performed with high excesses of swelling agent. For performing the method, however, as a rule it is sufficient if during a treatment step the primary swelling agent content in the said starting mixture ($M_I$) is a maximum of 95 wt %, preferably a maximum of 90 wt % and particularly preferably a maximum of 80 wt %, in relation to the total weight of polymer(s) and primary swelling agent (A) in the starting mixture ($M_I$).

Particular preference is therefore for a method for producing a flavoring substance-included compound (as described above), wherein in step (I) prior to inclusion of swelling agent the proportion of primary swelling agents (A) in a starting mixture ($M_I$) comprising polymer of formula (I) and primary swelling agent (A) is in the range 20 to 95 wt %, preferably in the range 30 to 90 wt %, particularly preferably in the range 40 to 80 wt %, in relation to the total weight of polymers and primary swelling agent (A) in the starting mixture ($M_I$).

Where during the first swelling, i.e. the inclusion of primary swelling agents (A) in polymer(s) of formula (I), high swelling agent excesses are used and the method includes a step (II) as defined above (replacement of primary swelling agent by secondary swelling agent), it is advantageous, between step (I) and step (II) to partially remove swelling agent that has not been included, e.g. by filtering, pressing, centrifuging and/or drying. The aim is to reduce the content of primary swelling agent to a level that allows maintenance of the swelling state of the polymer (at least for a certain period) but which nevertheless promotes the embedding of the flavoring substances. Too high a content of primary swelling agent would on the other hand hamper the embedding of flavoring substances.

As a rule (i.e. depending on the design of the method) complete removal is not recommended here, since the swelling, i.e. the inclusion of the swelling agent is reversible and if the removal is too thorough a (partial) reversion of the polymer into the unswollen state can be caused (depletion), so that the secondary swelling agents (B) in step (II) cannot be included to the desired extent. This fact should in particular be taken into account when reducing the proportion of swelling agent by drying, in particular when drying by convection drying, contact drying or dielectric drying. During purely mechanical removal of the swelling agent, in particular the water swelling agent, e.g. by filtering, pressing and centrifuging on the other hand a reversion to the unswollen state is not expected, i.e. even a complete removal of swelling agent that has not been included as a rule does not have a negative effect. With the application of freeze-drying (for details of freeze-drying see below) depletion is not expected. For here the structure imparted by the ice, according to our own investigations, despite the complete removal of the swelling agent, in particular the water swelling agent, leads to the polymer remaining in a "quasi-swollen", activated state. Through further treatment with a secondary swelling agent (without the need for the presence of a primary swelling agent) the swollen state can be recreated and an inclusion of the flavoring substances can take place. According to our own investigations, the quasi-swollen state is at its most stable when water is excluded as far as possible (for when there is contact with small quantities, i.e. for a water content of less than 15 wt %, there is a danger of the polymer changing from the semi-swollen state to the unswollen state).

Prior to a second swelling, i.e. prior to step (II) or step (IIb) the proportion of included swelling agent is preferably at least 5 wt %, preferably at least 10 wt % and particularly preferably between 20 and 50 wt % in relation to the total weight of polymer(s) and included swelling agent. Since the swollen state of the polymer at very low swelling agent residue proportions can only be maintained for a short time, immediate further processing is preferable. It is also the case here that when freeze-drying is used (as described further below)) does not apply. In the case of freeze-drying the proportion of included swelling agent, in particular when using the swelling agent water, accordingly also drops to values in the range 0 to 5 wt % with the swollen state being extensively maintained. Advantageously in this way better storage capability (in particular between steps (I) and (II)) is achieved.

According to the primary swelling agents (A) selected, the polymer pre-swollen in step (I) is possibly treated in step (II) with secondary swelling agents (B). Advantageously in doing so primary swelling agent that is incompatible with the flavoring substances to be included in step (III) is partially or completely replaced by compatible secondary swelling agent (B). Compatibility within the meaning of this invention exists in particular if the flavoring substances to be included have good or preferably total solubility in the swelling agents or swelling agent mixtures that they are to replace. A second swelling by a step (II) is therefore in particular advantageous if the flavoring substances to be included are not or largely not soluble in the primary swelling agents (A) from step (I). When using primary swelling agents (A) from group (a2) in step (I) their replacement by secondary swelling agents (B) is unnecessary, because the swelling agents from group (a2) can be replaced by flavoring substances to be used according to the invention, but replacement by secondary swelling agents can be carried out as an option. Quantities, method parameters and equipment for the second swelling are essentially identical to those of the first swelling. The second swelling, like the first swelling, can be carried out via the liquid phase, gas phase or a combination of the liquid and gas phases (for details see the description further above).

Following swelling in step (II) further swellings with further secondary swelling agents (B) can be carried out in a similar manner.

Prior to replacement of the included swelling agents by flavoring substances in step (III) the included swelling agent proportion in the polymer of formula (I) should be set at an optimum value. Therefore for a method for producing a flavoring substance-included compound (as described above) it is preferably the case that the included (primary and/or secondary) swelling agent to be replaced in step (III) is a component of a starting mixture ($M_{III}$), containing polymer of formula (I) and included and possibly (residual quantities of) non-included (primary and/or secondary) swelling agent, wherein the total proportion of included and non-included swelling agent is in the range 5 to 90 wt %, preferably in the range 10 to 70 wt %, particularly preferably in the range 20 to 50 wt %, in relation to the total weight of polymer and included and not included swelling agent in the starting mixture ($M_{III}$).

In the context of the present text, the term "starting mixture ($M_{III}$)" designates a mixture that exists at the start of the step (III) according to the invention (replacement of included swelling agents by flavoring substance), which includes polymer of formula (I) (pre-swollen by primary and/or secondary swelling agent according to step (I), (II) or (IIb)), and included and possibly (residual quantities of) non-included (primary and/or secondary) swelling agent, but still no flavoring substances to be included.

Regarding the proportion of swelling agent in the polymer prior to replacement of the included swelling agent by flavoring substances in step (III) it is additionally the case that a method for producing a flavoring substance-included compound as described above is particularly preferred, wherein included primary swelling agent (A) to be replaced is in step (III) a component of the starting mixture ($M_{III}$), which contains polymer and included and possibly (residual quantities of) non-included (primary and/or secondary) swelling agent, wherein the ratio of weight of the total quantity of (included and possibly non-included) primary swelling agent (A) to the total quantity of polymer(s) of formula (I) in the starting mixture ($M_{III}$) is between 1:4 and 1:10,000, preferably between 1:9 and 1:10,000, and especially preferably between 1:10 and 1:10,000. These ranges of values should in particular be adhered to for water as the primary swelling agent (A), since a water content that is too high, i.e. above the stated ratios, can hinder or even prevent the inclusion of flavoring substances (that stated above concerning an excessive content of primary swelling agent and the associated complications in embedding the flavoring substances applies here by analogy). When using high swelling agent excesses during the during the first or second swelling prior to contact between the (pre-swollen) polymer and the flavoring substances in step (III) the excess must be reduced to a suitable swelling agent proportion. This can take place for example by decanting or by analogy to the statements further above by centrifuging, pressing and/or drying with maintenance of the swollen state.

The replacement of the (included) swelling agent by flavoring substances in step (III) preferably takes place by mixing the pre-swollen polymer (or the starting mixture ($M_{III}$)) with the flavoring substances. For the equipment to be used the same rules apply as for the swelling of the polymer(s) described above, i.e. a person skilled in the art decides on the basis of the state of the (pre-swollen) polymer (solid, paste, liquid) on what equipment is suitable.

In a particularly preferred embodiment of the method according to the invention prior to the execution of step (III) the quantity of (included or non-included) swelling agent remaining from step (I) or step (II) or (IIb) is selected such that the starting mixture ($M_{III}$) has the appearance of a solid. Following addition of the flavoring substances the resulting mixture preferably likewise has the appearance of a solid. This advantageously ensures that the losses of flavoring substances in any subsequent step (IV), i.e. when removing the swelling agent not replaced by flavoring substances, is at all events low.

When executing in accordance with the invention in particular the particularly preferred embodiment described above the losses (ratio of flavoring substances used to encapsulated flavoring substances*100%) of the flavoring substances used is advantageously less than 50%, preferably less than 20% and particularly preferably less than 10%. In particularly preferred embodiments of the method according to the invention even flavoring losses of less than 1% can arise. Because of the preferred use of a starting mixture ($M_{III}$) as a solid the distribution of the flavoring substances in the polymer largely takes place via the gas phase. It is therefore advantageous to seal the mixture of flavoring substance(s) and swollen polymer (including included and non-included swelling agent) in a vessel. For a more rapid distribution the flavoring substances are preferably, by way of example, sprayed, dropped or poured onto the swollen polymer. Additional mixing with using suitable equipment is also advantageous and therefore preferred according to the embodiment.

The mixing times when mixing the pre-swollen polymer with the flavoring substances in step (III) are preferably, depending on the nature and purpose of the flavoring substances to be included and according to the mixing equipment and temperature, approximately 3 minutes to approximately 24 hours. The mixing times are preferably between approximately 3 minutes and one hour. The temperature during the mixing process is preferably between approximately 0 and 130° C., preferably between 10 and 60° C. and particularly preferably between 15 and 40° C. Our own investigations have shown that it is advantageous to increase the temperature in the initial stage and to lower this over time. Here the temperatures in the initial stage are by way of example between 40 and 100° C., preferably between 40 and 80° C. and particularly preferably between 40 and 60° C. The temperatures are then lowered over time to, for example, 0 to 39° C., preferably 10 to 39° C. and particularly preferably 15 to 30° C.

The removal of swelling agent not replaced by flavoring substances that takes place in a step (IV) described previously preferably takes place by circulating gas freely or around or through or in a vacuum. The removal of this swelling agent preferably takes place by circulating gas freely or around or through. Suitable gases are, by way of example, air, nitrogen, dinitrogen monoxide, and carbon dioxide as well as mixtures of these gases. These gases used for removal of swelling agent preferably have an optimum relative atmospheric humidity. The gases used preferably have a relative atmospheric humidity of 0 to 70%, preferably of 0 to 60% and particularly preferably of 0 to 50%. The temperature of the gases here is preferably approximately 0 to 100° C., preferably 0 to 40° C. and particularly preferably 0 to 25° C. The production of gases with a defined moisture content will be known to a person skilled in the art and can, for example, take place by mixing gases with different moisture contents, humidification of gases with water or steam or by condensation.

In the complete absence of primary swelling agent, in particular in the complete absence of water, e.g. with complete washing out or complete freeze-drying in combination with (virtually) anhydrous removal of any secondary swelling agent present (e.g. at approximately 0% atmospheric humidity; see above), there is the danger however, that the polymer following inclusion of the flavoring substances does not sufficiently close up. This means that although the flavoring substances are in fact included, volatilization (even if delayed compared also with flavoring substances attaching to the surface of the polymers) of included flavoring substances takes place. In order to convert such a flavoring substance-included compound into a more stable, i.e. better protected from volatilization of the included flavoring substances, form, our own investigations have shown that it is advantageous to apply a method according to the invention for producing a flavoring substance-included compound (as described above), wherein after the inclusion of the flavoring substances a quantity of water is added, which is below an effective swelling agent concentration, so that no increase in the distance between the polymer chains of the flavoring substance-included compound takes place. The step is preferably carried out in a sealed container.

Accordingly a method according to the invention for producing a flavoring substance-included compound (as described above) also includes after step (III) or—where present—after step (IV) preferably the following step:

addition of water to the polymer(s) of formula (I) with included flavoring substances in a quantity so that the volatilization of flavoring substances included in the polymer is reduced.

The appropriate quantity of water can be determined by a person skilled in the art without great effort taking into account the theory of the present text.

In the following further details of preferred embodiments according to the invention of the method described above for producing a flavoring substance-included compound are described.

The following explanations concern a preferred method according to the invention for producing a flavoring substance-included compound, comprising the steps (I), (II), (III) and (IV) defined and described above:

The use of this kind of method has proven to be particularly advantageous when using the primary swelling agent (A) water and the secondary swelling agents (B) ethanol or propanol.

The execution of this kind of method according to the invention is particularly advantageous and appropriate if the primary swelling agent (A) and the flavoring substances to be included are incompatible with one another, i.e. if they are not, or are hardly, soluble in one another, mixing is only possible with the formation of separate phases or undesired reactions of the primary swelling agent and the flavoring substances occur.

Swelling with one of the above-mentioned preferred primary swelling agents (A) takes place as described further above. After the first swelling in step (I) the total proportion of the (included and non-included) primary swelling agents (A) prior to replacement of the included swelling agents (A) in step (II) in a starting mixture ($M_{II}$), comprising polymer(s) and included and non-included swelling agent (A), is preferably approximately 5 to 90 wt %, preferably 10 to 60 wt % and particularly preferably 20 to 50 wt %, in relation to the total weight of polymers and included and non-included primary swelling agent (A) in the starting mixture ($M_{II}$). Here it should be noted that the first swelling as a rule is reversible and the polymer in particular when there is a reduction in the content of primary swelling agent (A) (i.e. below 20 wt %, in particular below 15 wt %) in the starting mixture (MII)) and longer storage can revert to the un-swollen state. With such low contents of primary swelling agent (A) the swollen state is still stable over a number of hours, however, so that the timeframe for further processing in the manner according to the invention can be adhered to without problems. Where the swollen polymer is stored (between step (I) and (II)) for longer than approximately 12 to 24 hours, the swollen state can, however, change back to the un-swollen state and the production of the flavoring substance-included compound according to the invention is complicated or is no longer possible.

In the context of the present text, the term "starting mixture ($M_{II}$)" designates a mixture that exists at the start of the optional step (II) according to the invention (replacement of included primary swelling agents by secondary swelling agents) which contains polymer (pre-swollen according to step (I) by primary swelling agent) and included and possibly (residual quantities of) non-included primary swelling agent.

Swollen polymer(s) with a high proportion of primary swelling agent (i.e. above 40 wt %, preferably above 50 wt % in the starting mixture ($M_{II}$)) as a rule can be stored for a long period, provided they are stored in a sealed container.

The replacement of the primary by the secondary swelling agent can take place once or repeatedly under the conditions mentioned further above. Repeated replacement, i.e. repetition of step (II) is as a rule necessary if in order to remove excess primary swelling agent quantities prior to step (II) no mechanical aids (e.g. press, centrifuge) are used.

Then the preferred procedure is as follows: the starting mixture ($M_{II}$) has a large quantity of secondary swelling agent (B) added, so that a low viscosity liquid containing dispersed (pre-swollen) polymer results. A mixing process as described above is carried out and then as much (non-included) swelling agent as possible is removed (gently, e.g. by decanting, filtering or drawing off via a drain). The addition of the secondary swelling agent (B), execution of the mixing process and removal of the swelling agents (primary and secondary) is repeated a total of approximately two to three times. There then follows step (III), i.e. the replacement of included swelling agents (here: mainly secondary swelling agents (B)) by flavoring substances.

Through the use of mechanical aids (e.g. presses, centrifuges) for the removal of excess primary swelling agents (A) advantageously a repeated treatment with the secondary swelling agent (B) is superfluous or the necessary quantity of secondary swelling agent (B) to be used is reduced, so that a single treatment with smaller quantities of secondary swelling agent (B) than without the help of the mechanical aids is possible. Where a single treatment with relatively small quantities of secondary swelling agent (B) is sufficient, in order to reduce the quantity of primary included swelling agent (A) to such an extent that the flavoring agent-included compound according to the invention can result, the content of primary swelling agent (A) in the starting mixture ($M_{II}$) should preferably be less than 60 wt %, in relation to the total weight of polymer and included and non-included primary swelling agent (A) in the starting mixture ($M_{II}$). The content of primary swelling agent (A) in the starting mixture ($M_{II}$) following the use of mechanical aids (as described above) is advantageously 40 to 50 wt %. Without prior use of mechanical aids the content of primary swelling agent (A) in the starting mixture ($M_{II}$) is often between approximately 70 and 90 wt %.

Apart from the use of mechanical aids the removal of excess primary swelling agents can also take place by drying. In the context of the present invention the term drying means the removal or reduction of swelling agents by vaporescence, evaporation or sublimation. The advantage of drying is that the content of primary swelling agent can be lowered a relatively long way, that is to say to a value of less than 20 wt %, in particular less than 15 wt % in relation to the total weight of polymer and primary swelling agent. The advantage here is that in particular when volatile primary swelling agents from group (a1) are used, including in particular water, only a small quantity of secondary swelling agent (B) is needed. Advantageously here the quantity of secondary swelling agent (B) is preferably selected to be lower than when mechanical aids are used, since here the secondary swelling agents from group (B) in many cases are no longer needed to reduce the proportion of primary swelling agent, but primarily serve (only) for preparation of the polymer for inclusion of the flavoring substances. Here under certain drying conditions the surprising effect already described above can be taken advantage of so that once primary swelling has taken place, although the swelling agent content has already been reduced or lowered to a level at which the polymer would actually (again) be present in the un-swollen state, at least for a short time it maintains the swollen state (quasi-swollen, activated state). The quantity of the secondary swelling agent (B) to be used is in this special case of execution preferably 0.5 kg to 2 kg/kg polymer including any accompanying substances present.

Without (at least short term) maintenance of the swollen state during the execution of the drying as a function of the parameters applied a depletion of the polymer(s) of formula (I) takes place. The drying should therefore preferably be performed in a very controlled manner. Generally when using freeze-drying there is minimal tendency towards depletion of the (pre-swollen) polymer. With other types of drying in order to maintain the swollen state of the polymer a relatively low temperature, i.e. preferably less than 100° C., preferably less than 60° C. and particularly preferably less than 40° C. should preferably be used. Apart from this the individual polymer fibers from a number of polymer fibers should preferably dry as evenly as possible over time, in order to prevent depletion of the individual polymer fibers. In this connection therefore fluid bed drying is particularly preferable. After drying rapid further processing is advantageous, since the quasi-swollen, activated state can only be maintained as a rule for a short time with the low content of primary swelling agent set by drying. Further details of this have already been described further above.

Where repeated treatment of the polymer with secondary swelling agent (B) is to be avoided, in the context of the method according to the invention the process of percolation can be applied. The execution of and equipment for percolation will be known to a person skilled in the art, for example from the production of spice and herbal extracts for liquor production. During percolation within the meaning of the present invention the secondary swelling agent (B) slowly flows through a polymer layer enriched with primary swelling agent (A) and removes the primary swelling agent (A) from the polymer. The thickness of the polymer layer here is preferably a few centimeters to a few meters. Because of the continuous execution of the percolation the repeated treatments with the secondary swelling agents (B) can advantageously be reduced to a single treatment, with comparable lower equipment requirements and lower consumption of swelling agent. For the temperature and the time during percolation the statements made further above apply.

Alternatively the treatment with the secondary swelling agent (B) preferably takes place by vaporization. For further information on vaporization see the statements further above. Advantages of vaporization are a low(er) consumption of swelling agent, continuous execution and an optimum residual swelling agent content in the starting mixture ($M_{III}$) for the following treatment with flavoring substances in step (III).

The following explanations concern a method as described above for producing a flavoring substance-included compound, comprising the steps (I), (II), (III) and (IV) defined above, wherein in step (I) apart from one or more primary swelling agents (A) additionally one or more secondary swelling agent(s) (B) is (are) used:

According to this embodiment the first swelling is carried out with a mixture of primary and secondary swelling agents. Advantageously in this variant is the parallel execution of the primary and secondary swelling, whereby the number of treatments necessary with the secondary swelling agent is reduced. As a rule it is sufficient, following the first swelling with the mixture of primary and secondary swelling agents to perform just a single swelling with the secondary swelling agent (B). The use of mechanical aids, such as presses or centrifuges, is in this case advantageously usually not absolutely necessary. Here the mixture of primary and secondary swelling agents preferably has a minimum content of primary swelling agent (A) of 25 wt % in relation to the total weight the mixture. In this way a sufficient primary swelling is achieved. The mixture preferably comprises 25 to 99 wt % of primary swelling agent (A) and 1 to 75 wt % secondary swelling agent (B), particularly preferably 30 to 60 wt % a primary swelling agent (A) and 40 to 70 wt % secondary swelling agent (B), in each case in relation to the total weight of the mixture.

The application of a mixture of primary and secondary swelling agents in step (I) has in particular proven itself for the primary swelling agent (A) water in combination with the secondary swelling agent (B) ethanol or propanol. Further preferred combinations are, for example, the primary swelling agent (A) acetic acid (glacial acetic acid) in combination with the secondary swelling agent (B) ethanol or propanol as well as mixtures of water, acetic acid and ethanol or water, acetic acid and propanol.

The following explanations concern a method as described above for producing a flavoring substance-included compound, comprising the steps (I), (Ill) and (IV) defined above, wherein the method does not contain a step (II) as defined above and the primary swelling agent (A) is preferably selected from group (a2):

According to this preferred embodiment of the method according to the invention the polymer is treated in step (I) with a primary swelling agent (A) from group (a2) and then treated directly with the flavoring substances to be included (step (III)). The particular advantage of this embodiment is the simplicity of the method. Mechanical aids or repeated treatments with one or more swelling agent(s) are not necessarily required. A primary swelling agent (A) from group (a2) is on the one hand able to release the hydrogen bridge bonds between the OH groups of the polymer and on the other has very good solubility or miscibility with the flavoring substances to be included, i.e. combines well with the flavoring substances. Only very few substances meet the requirements of such a primary swelling agent. One example of such a substance is acetic acid (universal swelling agent).

With this method embodiment according to the invention it is extremely advantageous that the water content of the polymer to be used is below 20 wt %, in particular below 15 wt % and during the method, i.e. up until inclusion of the flavoring substances, is kept below these values (that stated above concerning the water content applies here by analogy). Should higher water contents be present then there would be a danger of the water occupying the relevant bonding sites in the polymer thereby impeding the inclusion of the flavoring substances.

Accordingly for the universal swelling agent applied according to this embodiment (primary swelling agent of group (a2)), it is also the case that this preferably—where it is present in a mixture with water—has only a very low water content, preferably of less than 10 wt %, preferably less than 5 wt % and particularly preferably less than or equal to 1 wt %, so that the water content of the polymer is not raised or only insignificantly so. In connection with the present invention it is generally the case that the universal and secondary swelling agent—where this is present in a mixture with water—preferably have only a low water content, preferably of less than 30 wt %, preferably less than 10 wt % and particularly preferably less than or equal to 1 wt %.

The following explanations concern a further alternative embodiment of a method according to the invention for producing a flavoring substance-included compound.

According to this embodiment initially various swelling agents are reacted with one another, so that one or more further substance(s) result. For example, this embodiment is preferably carried out by treating polymer(s) of formula (I) with a primary swelling agent (A) and then adding a secondary swelling agent (B), so that the primary swelling agent (A) reacts with the secondary swelling agent (B) to form one or more additional substances (likewise swelling agent(s) within the meaning of the above definition). Here, however, it is also possible for one or more of these additional substance(s) to be a flavoring substance (e.g. propyl acetate) or flavoring substances.

Here it is advantageous if at least one, preferably all, of the substances resulting from the reaction has or have a lower boiling temperature than one or both of the converted swelling agent(s). An example of such a swelling agent consists of acetic acid (glacial acetic acid) as the primary swelling agent (A) and ethanol as the secondary swelling agent (B). Where these two swelling agents are processed at low temperatures (in the range 0 to approximately 50° C.), hardly any reaction or only a very slight reaction between the two swelling agents takes place. At high temperatures (above approximately 50° C.), preferably at a temperature in the range 80 to 120° C. acetic acid and ethanol react to form acetic acid ethyl ester and water. The boiling temperatures of the swelling agents are approximately 118° C. (acetic acid) and 78° C. (ethanol). The boiling temperatures of the reaction products are 100° C. (water) and 77° C. (acetic acid ethyl ester). The conversion therefore leads to products which in each case are more volatile than at least one of the actual swelling agents used. The proportion of water that results can in this embodiment be easily controlled via the quantity of starting materials used, such that the proportion of water in relation to the total weight of water and polymer(s) is below 20 wt %, in particular below 15 wt % and thus later in the process (i.e. when the flavoring substances are included) does not impede the formation of the flavoring substance-included compounds according to the invention. The danger of the embedding of the flavoring substances being impeded by an excessive content of primary swelling agent has already been described further above. Following partial replacement of the products or the newly formed swelling agent by the flavoring substances to be included in step (III) the newly formed non-included swelling agents can advantageously be removed in step (IV) particularly easily by treatment with freely circulating gases. As a result of this losses of particularly volatile included flavoring substances are reduced.

According to the method explained above for producing a flavoring substance-included compound the present invention concerns in particular a flavoring substance-included compound (as described above) or a mixture (as described above), wherein the flavoring substance-included compound or the mixture can be produced by a method according to the invention (as described above).

A further aspect of the present invention concerns the use of a flavoring substance-included compound according to the invention, preferably a flavoring substance-included compound (as described above) designated above as preferred, or a mixture according to the invention, preferably a mixture (as described above) designated above as preferred, for the flavoring of a preparation or semi-finished products for nourishment or pleasure.

The present invention also concerns a preparation or semi-finished product for nourishment or pleasure, comprising a preferably sensorially active quantity of a flavoring substance-included compound according to the invention, preferably a flavoring substance-included compound (as described above) designated above as preferred or a mixture according to the invention, preferably a mixture (as described above) designated above as preferred.

Preference is for a preparation or semi-finished product for nourishment or pleasure as described above, wherein the total proportion of flavoring substance-included compound in relation to the total weight of the preparation or semi-finished product is in the range 0.001 to 10 wt %, especially in the range 0.25 to 5 wt %, particularly preferably in the range 0.5 to 3 wt %.

Preparations or semi-finished products according to the invention for nourishment or pleasure are preferably chosen from the group comprising:
bakery products (for example bread, dry biscuits, cakes, muffins, waffles, baking mixes, other pastry products), confectionery (for example white, milk or dark chocolates, filled chocolates (for example filled with aromatized fondant mass of the After Eight type), chocolate bars, other bar products, chewing candies, fruit gums, hard-boiled and soft candies, chewing gum, sugar pearls, lollipops), capsules (preferably seamless capsules for direct consumption, preferably with a shell based on gelatin and/or alginate), fat masses (for example fillings for baked goods such as for example biscuit fillings, fatty chocolate fillings, fatty chocolate bar fillings), toppings, alcoholic or non-alcoholic beverages (for example coffee, tea, wine, wine-based beverages, beer, beer-based beverages, liqueurs, spirits, brandies, fruit-based carbonated beverages, isotonic beverages, soft drinks, nectars, fruit and vegetable juices, fruit or vegetable juice preparations), instant beverages or instant powders (for example instant cocoa beverages, instant tea beverages, instant coffee beverages, instant desserts in powder form such as custard powder or jelly), meat products (for example ham, fresh or cured sausage preparations, spiced or marinated fresh or cured meat products), eggs or egg products (for example dried egg powder), cereal products and/or nut products (for example breakfast cereals, cornflakes, oat flakes, muesli, muesli bars, trail mix, sweet popcorn, nut bars, fruit and nut bars, precooked ready rice products), dairy products (for example milk beverages, milk ice cream, yogurt, custard, kefir, curd cheese, soft cheese, hard cheese, dried milk powder, whey, butter, buttermilk, products containing partially or entirely hydrolyzed milk protein), products made from Soya protein or other Soya bean fractions (for example Soya milk and products produced therefrom, preparations containing Soya lecithin, fermented products such as tofu or tempeh or products produced therefrom, Soya sauces), fruit preparations (for example jams, fruit ice cream, fruit sauces, fruit fillings), vegetable preparations (for example ketchup, sauces, dried vegetables, deep-frozen vegetables, precooked vegetables, pickled vegetables, preserved vegetables), snack articles (for example baked or fried potato chips or potato dough products, bread dough products, maize- or peanut-based extrudates), fat- and oil-based products or corresponding emulsions (for example mayonnaise, remoulade, dressings, seasoning preparations), other ready-to-serve meals and soups (for example dried soups, instant soups, precooked soups), spices, seasoning mixtures and in particular powdered seasonings, which are for example used in snack food applications Preparations or semi-finished products according to the invention for nourishment or pleasure may also be nutritional supplements in the form of capsules, tablets (uncoated and coated tablets, for example coatings resistant to gastric juices), sugar-coated tablets, granules, pellets, mixtures of solids, dispersions in liquid phases, as emulsions, as powders, as solutions, as pastes or as other swallowable or chewable preparations.

Preferred preparations or semi-finished products for nourishment or pleasure are preferably selected from the group comprising:
confectionery such as for example hard candies, chewing gums, fruit gums, chewable candies, sugar-coated (refreshing) lozenges, compressed lozenges, hard caramels, chocolate spreads, candies and chocolate, bakery products such as cakes, wafers and cookies, snacks, instant meals and other instant products (soups, sauces, beverage powders and granules, seasoning mixtures), ice cream, fruit preparations, (marmalades, jams, fruit sauces), desserts (blancmange, jelly), dairy products (quark, yogurt, milk drinks, whey preparations) and cereals (cornflakes, muesli bars). In addition, use is also advantageous in nutritional supplements and pharmaceutical products, such as suckable tablets, throat or cough drops, pharmaceutical powders, tablets or granules.

The snacks according to the invention preferably comprise salty snacks, such as for example potato/corn chips, extrudates, pellets, popcorn, crackers, lye rolls and fried or oven-baked dough products. Flavoring substance-included compound according to the invention or an aroma composition comprising flavoring substance-included compound according to the invention may be incorporated into a snack article or applied thereto. Incorporation or application may be achieved by means of powdered seasoning, sprayed-on oil slurry, fatty fillings or dough aromatization.

Further constituents which may be used for preparations or semi-finished products according to the invention serving for nutrition or pleasure are conventional basic and auxiliary substances and additives for foodstuffs or products consumed for pleasure, for example water, mixtures of fresh or processed, plant or animal basic or raw materials (for example raw, roasted, dried, fermented, smoked and/or boiled meat, bone, cartilage, fish, vegetables, fruit, herbs, nuts, vegetable or fruit juices or pastes or mixtures thereof), digestible or indigestible carbohydrates (for example amylose (which is not a polymer of formula (I)), amylopectin, inulin, xylans, cellulose (which is not a polymer of formula (I)), natural or hardened fats (for example tallow, lard, palm fat, coconut oil, hardened vegetable fat), oils (for example sunflower oil, peanut oil, corn germ oil, olive oil, fish oil, soy oil, sesame oil), fatty acids or the salts thereof (for example potassium stearate), proteinogenic or non-proteinogenic amino acids and related compounds (for example γ-aminobutyric acid, taurine), peptides (for example glutathione), native or processed proteins (for example gelatin), enzymes (for example peptidases), nucleic acids, nucleotides, taste-correcting agents for unpleasant taste impressions, further taste modulators for further, generally not unpleasant taste impressions, other taste-modulating substances (for example inositol phosphate, nucleotides such as guanosine monophosphate, adenosine monophosphate or other substances such as sodium glutamate or 2-phenoxypropionic acid), emulsifiers (for example lecithins, diacylglycerols, gum Arabic), stabilizers (for example carageenan, alginate), preservatives (for example benzoic acid, sorbic acid), antioxidants (for example tocopherol, ascorbic acid), chelating agents (for example citric acid), organic or inorganic acidulants (for example malic acid, acetic acid, citric acid, tartaric acid, phosphoric acid), bitter substances (for example quinine, caffeine, limonin, amarogentin, humolone, lupolone, catechins, tannins), mineral salts (for example sodium chloride, potassium chloride, magnesium chloride, sodium phosphates), substances preventing enzymatic browning (for example sulfite, ascorbic acid), essential oils, plant extracts, natural or synthetic dyes or coloring pigments (for example carotenoids, flavonoids, anthocyans, chlorophyll and the derivatives thereof), spices, trigeminally active substances or plant extracts containing such trigeminally active substances, cooling active ingredients such as for example menthol, menthol derivatives (for example L-menthol, L-menthyl lactate, L-menthyl glutarate, L-menthyl succinate) or cubebol, synthetic, natural or nature-identical aroma substances or odoriferous substances and odor-correcting agents.

Preparations or semi-finished products according to the invention serving for nutrition or pleasure preferably additionally contain one or more taste-correcting agents, preferably selected from the following list: nucleotides (for example adenosine 5'-monophosphate, cytidine 5'-monophosphate) or the pharmaceutically acceptable salts thereof, lactisole, sodium salts (for example sodium chloride, sodium lactate, sodium citrate, sodium acetate, sodium gluconate), further hydroxyflavanones (for example eriodictyol, homoeriodictyol or the sodium salts thereof), in particular according to US 2002/0188019, hydroxybenzoic acid amides according to DE 10 2004 041 496 (for example 2,4-dihydroxybenzoic acid vanillylamide, 2,4-dihydroxybenzoic acid N-(4-hydroxy-3-methoxybenzyl)amide, 2,4,6-trihydroxybenzoic acid N-(4-hydroxy-3-methoxybenzyl)amide, 2-hydroxybenzoic acid N-4-(hydroxy-3-methoxybenzyl) amide, 4-hydroxybenzoic acid N-(4-hydroxy-3-methoxybenzyl)amide, 2,4-dihydroxybenzoic acid N-(4-hydroxy-3-methoxybenzyl)amide monosodium salt, 2,4-dihydroxybenzoic acid N-2-(4-hydroxy-3-methoxyphenyl) ethylamide, 2,4-dihydroxybenzoic acid N-(4-hydroxy-3- ethoxybenzyl)amide, 2,4-dihydroxybenzoic acid N-(3,4-dihydroxybenzyl)amide and 2-hydroxy-5-methoxy-N-[2-(4-hydroxy-3-methoxyphenyl)ethyl]amide (aduncamide), 4-hydroxybenzoic acid vanillylamide), bitterness-masking hydroxydeoxybenzoins according to WO 2006/106023 and the documents based thereon (Symrise) (for example 2-(4-hydroxy-3-methoxyphenyl)-1-(2,4,6-trihydroxyphenyl) ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone), amino acids (for example gamma-aminobutyric acid according to WO 2005/096841 for reducing or masking an unpleasant taste impression such as bitterness), malic acid glycosides according to WO 2006/003107, salty tasting mixtures according to WO 2007/045566, diacetyl trimers according to WO 2006/058893, divanillin, mixtures of whey proteins with lecithins and/or bitterness-masking substances such as gingerdione according to WO 2007/003527.

Preparations or semi-finished products according to the invention serving for nutrition or pleasure may additionally contain one or more alkamides, preferably selected from the group consisting of: 2E,4E-decadienoic acid N-isobutylamide (pellitorine), 2E,4Z-decadienoic acid N-isobutylamide (cis-pellitorine), 2Z,4Z-decadienoic acid N-isobutylamide, 2Z,4E-decadienoic acid N-isobutylamide, 2E,4E-decadienoic acid N-([2S]-2-methylbutyl)amide, 2E,4E-decadienoic acid N-([2S]-2-methylbutyl)amide, 2E,4E-decadienoic acid N-([2R]-2-methylbutylamide), 2E,4Z-decadienoic acid N-(2-methylbutyl)amide, 2E,4E-decadienoic acid N-piperide (achilleamide), 2E,4E-decadienoic acid N-piperide (sarmentine), 2E-decenoic acid N-isobutylamide, 3E-decenoic acid N-isobutylamide, 3E-nonenoic acid N-isobutylamide, 2E,6Z,8E-decatrienoic acid N-isobutylamide (spilanthol), 2E,6Z,8E-decatrienoic acid N-([2S]-2-methylbutyl)amide (homospilanthol), 2E,6Z,8E-decatrienoic acid N-([2R]-2-methylbutyl)amide, 2E-decen-4-ynoic acid N-isobutylamide, 2Z-decen-4-ynoic acid N-isobutylamide, sanshool.

Flavoring substance-included compound according to the invention or flavoring substance-included compound produced by a method according to the invention can for example be demonstrated on the basis of NMR or by X-ray diffraction spectroscopy.

Because of the predominant use of liquid flavoring substances the principle described in the following can in particular be applied. Liquid flavoring substances (flavoring substances, that are not applied to a carrier) generate in the liquid echo NMR experiment in the time domain a signal with a starting signal amplitude at time t=0 of A1(t=0), wherein A1(t=0) is greater than 0. Where the flavoring substances used in each case are present in a manner not in accordance with the invention in association with polymer(s) of formula (I), for example as a simple mixture of flavoring substances and polymer(s) of formula (I) (which when looked at with the human eye may indeed appear to be a solid), the signal from the flavoring substances is detected in the liquid echo NMR experiment. Here A1(t=0) for the liquid flavoring substances and A2(t=0) for a corresponding flavoring substance-polymer mixture not according to the invention correspond to the greatest extent on condition that equivalent flavoring substance quantities are used. In flavoring substance-included compounds according to the invention, on the other hand, the included flavoring substances in the context of the liquid echo NMR experiment in the time domain are not detected as a fluid, but behave like a solid, i.e. they generate under comparable measurement conditions no signal intensity. A2(t=0) is thus 0.

The principle described above can also be applied in connection with common solid flavoring substances, by using in the NMR measurement a defined temperature above the melting point of the flavoring substances.

In order to determine the total flavoring substance content X (i.e. the content of included and non-included flavoring substances) of a sample with flavoring substance-included compound according to the invention in particular distillative and extractive sample re-conditionings or combinations of these can be used. In particular the sample reconditioning takes place by simultaneous distillation and extraction (SDE), the execution of which will be known to a person skilled in the art. Here it should be ensured that the production of the flavoring substances is exhaustive, for which reason the reconditioning should last at least 4 hours. The quantification can take place by gas chromatography.

The included flavoring substance content I (i.e. the content of included flavoring substances) of a sample with a flavoring substance-polymer (of course, what is meant is one or more polymers of formula (I) excluding cellulose and amylopectin) mixture or with a flavoring substance-included compound (according to the invention) can be calculated from:

$$I = X * \left(1 - \frac{A2(t=0)}{A1(t=0)}\right)$$

where
I=included flavoring substance content
X=total flavoring substance content=mass of flavoring substances/(mass of flavoring substances+mass of polymers)
and
A2(t=0)=starting amplitude at time t=0 of the flavoring substance sample of the flavoring-polymer sample or of the flavoring substance-included compound sample
A1(t=0)=starting amplitude at time t=0 of the flavoring substances without polymer, wherein the flavoring substance quantity corresponds to the flavoring substance quantity from the flavoring substance-polymer sample or the flavoring substance-included compound sample.

The normal procedure in the determination of A1 (t=0) and A2(t=0) is that from a flavoring substance polymer sample or flavoring substance-included compound sample to be investigated the total flavoring substance content X is determined. A1 (t=0) and A2(t=0) are determined with a NMR device, e.g. the Minispec mq 20 from Bruker. Initially a determination is made of how much weight of flavoring substance sample or flavoring substance-included compound sample $m_{(sample)}$ fits into a sample tube. This varies according to the bulk density of the sample and is normally 1 to 2 g. Using the mass $m_{(sample)}$ with the help of the total flavoring substance content X the mass of the flavoring substances contained therein $m_{(flavoring\ substance)}$ is calculated. An equivalent quantity of these flavoring substances (without polymer of formula (I)) with a mass of $m_{(flavoring\ substance)}$ is weighed in a separate sample tube and placed in the sample shaft of the NMR device. As an NMR experiment a 90° pulse, followed by 180° pulses each at 1.5 ms intervals is selected (liquid echo). The evaluations take place in the time domains. The starting amplitude is determined by means of a biexponential regression. The gain of the device is adapted such that A1(t=0) of the flavoring substance sample is approximately 75+/−10% of the maximum value of the signal intensity that can be displayed. The gain set in this way is maintained for determination of A1

(t=0) and A2(t=0). Following determination of A1(t=0), A2(t=0) of the mass $m_{(sample)}$ of the flavoring substance-polymer sample or the flavoring substance-included compound sample is determined. It is particularly important that the flavoring substances (without polymer of formula (I)) and the flavoring substance-polymer sample or the flavoring substance-included compound sample have the same temperature.

According to the invention the included flavoring substance content I particularly preferably corresponds to the total flavoring substance content X. In this case the quotient of I and X I/X=1. Furthermore it is also possible and depending on the application possibly also preferred, to produce a flavoring substance-included compound in the form of a mixture (an aggregate) in which the flavoring substance(s) included according to the invention and in other ways, in particular flavoring substances attached to the surface of the polymer(s), are contained. Such flavoring substance-included compound forms result in particular if the production according to the invention is performed with excesses of flavoring substances and the often more volatile swelling agents have already been vaporized, while the often somewhat less volatile flavoring substances remain on the surface of the polymer of formula (I), wherein additional flavoring substances are included in the polymer. In these cases I/X is between approximately 0.1 and 0.999 and preferably between 0.5 and 0.999.

Accordingly the present invention also concerns a mixture, comprising or consisting of flavoring substance-included compound according to the invention preferably designated above as preferred and non-included flavoring substances, which are materially identical to the included flavoring substances, wherein the non-included flavoring substances are partially attached to the surface of the flavoring substance-included compound. For preferred embodiments of such a mixture according to the invention and its components that stated further above applies by analogy.

Mixtures according to the invention (as described above) can of course contain further flavoring substances (i.e. flavoring substances, which differ materially from the included flavoring substances). As a result in a mixture according to the invention flavoring substances can be advantageously specifically combined with flavoring substance-included compounds according to the invention, in order to obtain a desired overall flavor impression, which could not be achieved by the flavoring substance-included compounds according to the invention on their own. In particular such a mixture can contain as further flavoring substances advantageously also flavoring substances which are not suitable or preferred for inclusion in a polymer of formula (I).

According to that stated above the present invention also concerns a mixture comprising or consisting of
(i+ii) flavoring substance-included compound according to the invention, preferably designated above as preferred and
(iv) possibly water and
(v) flavoring substances not included in polymer(s) of formula (I).

The flavoring substances (v) not included in polymer here include—in each case where present—both flavoring substances, which in the context of the method according to the invention are used for inclusion in a polymer of formula (I), but which here (despite generally having the ability to be included) have not been included, i.e. therefore also flavoring substances, which are materially identical to the included flavoring substances, and also flavoring substances, which are added as further, i.e. not for inclusion flavoring substances to the flavoring substance-included compounds according to the invention, wherein the further flavoring substances differ materially from the included flavoring substances. In particular therefore flavoring substances may be contained as flavoring substances not included in polymer which are not lipophilic.

For the selection of preferred components of such a mixture that stated above applies by analogy. Particular preference is for such a mixture, wherein the proportion of (i+ii) flavoring substance-included compound according to the invention and (iv) any water that is present is 50 to 99.9 wt %, preferably 75 to 99.9 wt %, in relation to the total weight of the mixture. Particular preference here is for the proportion of the (v) flavoring substances not included in the polymer to be 0.1 to 50 wt %, more preferably 0.1 to 25 wt %, in relation to the total weight of the mixture.

In the following the invention is explained in more detail with the use of examples. Unless otherwise stated the percentages given are mass percentages.

EXAMPLES

Examples 1-4

10 g of a polymer of table 1 are mixed with 30 g water and 70 g ethanol (purity >99.9%). The mixture is allowed to simmer for an hour. Under these conditions, the polymer of formula (I) is substantially not dissolved. The respective polymer is allowed to sediment and excess water-ethanol mixture is decanted off. 100 g of ethanol are added and the mixture is boiled for 45 minutes. Following filtration through a cotton cloth the polymer is wrung out. The residual content of the swelling agent in the polymer-swelling agent mixture is 64%. 10 g of d-limonene are added and using a spatula distributed in the polymer that has been wrung out. The mixture is filled into a three-necked flask and this is completely sealed for a period of 30 minutes. Then for 24 hours dry air with a temperature of 20° C. is passed through the flask. The limonene-polymer complex has a limonene content of 10.1%.

TABLE 1

| Example | polymer of formula (I) | included limonene [wt %] |
|---|---|---|
| 1 | amylopectin | 10.5 |
| 2 | chitosan | 10.9 |
| 3 | curdlan | 9.9 |
| 4 | lichenin | 9.5 |

Example 5

To 10 g of chitosan 100 g water is added, the mixture is heated to boiling and then allowed to simmer for one 10 minutes. The excess water is pressed off, and 100 g ethanol (purity 99.9%) are added to chitosan and boiled for 10 minutes. The ethanol is pressed of and new ethanol is again added, such that the chitosan is treated in total 3 times with ethanol. After finally pressing off the ethanol, 10 g of d-limonene are added to the chitosan and mixed thereto. Ethanol is removed by a dry air treatment as described in example 1. A d-limonene-chitosan inclusion compound having a d-limonene content of to 17.6 wt % is obtained.

Example 6-9

10 g of polymer of table 1 are mixed with 30 g water and 70 g ethanol, and the mixture is allowed to simmer for one hour. The excess swelling agent mixture is pressed out and boiling takes place again with 100 g ethanol. Excess swelling agent is pressed out, the swelling agent content of the mixture after pressing is 50%, and 1 g d-limonene is added. The limonene is distributed in the pre-treated polymer with a spatula and the mixture (which has the appearance of a solid) is stored in a sealed three-necked flask for one hour at 20° C. Then the remaining swelling agent is removed with dry air in the same way as in example 1-4. The limonene loading of the limonene-polymer complex according to the invention is approximately 8.5%. The limonene losses are just approximately 10%, i.e. approximately 90% of the limonene used was included in the polymer.

Examples 10-24

These examples are made according to examples 6-9, wherein the flavoring substances and polymers are replaced by:

| Example | Flavor | polymers of formula (I) |
| --- | --- | --- |
| 10 | peppermint flavor | chitosan |
| 11 | *mentha spicata* crispa flavor | beta-glucan of yeast |
| 12 | orange oil | amylopectin |
| 13 | lemon flavor | lichenin |
| 14 | strawberry flavor | lichenin |
| 15 | coffee flavor | lichenin |
| 16 | *vanilla* flavor | lichenin |
| 17 | beef flavor | lichenin |
| 18 | rum flavor | amylopectin |
| 19 | hazelnut flavor | amylopectin |
| 20 | fried flavor | amylopectin |
| 21 | onion flavor | chitosan |
| 22 | leek flavor | beta-glucan of yeast |
| 23 | tomato flavor | lichenin |
| 24 | whipped cream flavor | lichenin |

APPLICATION EXAMPLES

Example F1: Chewing Gum with Flavoring Substance-Included Compound According to the Invention The chewing gum base K2 consists of 28.5% terpene resin, 33.9% polyvinyl acetate (MW=14,000), 16.25% hydrogenated vegetable oil, 5.5% mono- and diglyceride, 0.5% polyisobutene (MW 75,000), 2.0% butyl rubber (isobutene-isoprene copolymer), 4.6% amorphous silicon dioxide (water content approximately 2.5%), 0.05% antioxidant tert.-butylhydroxytoluol (BHT), 0.2% lecithin and 8.5% calcium carbonate. The production of the chewing gum base can be performed in the same way as in U.S. Pat. No. 6,986,907.

| | Formulation I (wt %) | Formulation II (wt %) | Formulation III (wt %) |
| --- | --- | --- | --- |
| Chewing gum base K2 | 25.30 | 27.30 | 26.30 |
| Sorbitol | To 100 | To 100 | To 100 |
| Glycerine | 2.40 | 2.40 | 2.40 |
| Lecithin | 7.00 | 7.00 | 7.00 |
| Aspartame | 0.14 | 0.14 | 0.14 |
| Encapsulated aspartame | 0.68 | 0.68 | 0.48 |
| Menthol, spray-dried | 1.00 | 0.50 | 0.40 |
| Cherry flavoring, spray-dried | — | 1.20 | — |
| Flavoring substance-included compound from example 10 | 1.45 | — | 0.50 |
| Flavoring substance-included compound from example 11 | — | 1.15 | 0.50 |

The chewing gums of formulation (I) are formed as strips and those of formulations (II) and (III) as pellets.

Example F2: Sugar-Free Hard Caramels with Flavoring Substance-Included Compound According to the Invention

| Ingredient | A (wt %) | B (wt %) |
| --- | --- | --- |
| Palatinite, type M | To 100% | To 100% |
| Water | 24.82% | 24.82% |
| Peppermint flavoring | 0.15% | 0.05% |
| Orange flavoring | — | 0.10% |
| Hesperetin | — | 0.01% |
| Spilanthol | — | 0.01% |
| Trans-pellitorin | 0.01% | — |
| Flavoring substance-included compound from example 12 | 0.75% | 0.50% |

Palatinite is mixed with water and the mixture is melted at 165° C. and then cooled to 115° C. Aroma and flavoring substance according to the invention as well as trans-pellitorin in case A and spilanthol and hesperetin in case B are added and after thorough mixing casting into moulds takes place and, following solidification, removal from the moulds and then individual packaging.

Example F3: Low-Fat Yogurt with Flavoring Substance-Included Compound According to the Invention

| | Preparation (details in wt %) | | |
| --- | --- | --- | --- |
| Ingredient | A | B | C |
| Sucrose | 10% | 8% | 6% |
| Tagatose | — | — | 0.5% |
| Fructose | — | — | 0.5% |
| Hesperetin | — | 0.01% | 0.005% |
| Phloretin | — | — | 0.005% |
| Peach flavoring | 0.30% | — | 0.40% |
| Strawberry-rhubarb flavoring | — | 0.25% | — |
| Flavoring substance-included compound from example 14 | 0.25% | 0.90% | 0.40% |
| Yogurt, 0.1% fat | To 100% | To 100% | To 100% |

The ingredients are mixed and cooled at 5° C.

Example F4: Dietetic Chocolate Having a Fructose Base with Flavoring Substance-Included Compound According to the Invention A chocolate suitable for diabetics is produced from the following ingredients and cast into rectangular tablets: cocoa mass, fructose, skimmed milk powder, cocoa butter, inulin, clarified butter, Soya lecithin emulsifier, walnuts, table salt, yogurt-vanilla flavoring (containing vanillin and 1 wt % hesperetin, in relation to the total weight of the vanilla flavoring) and 1 wt % flavoring substance-included compound according to the invention from example 16.

Nutritional Value (per 100 g):

protein 8.8 g, carbohydrate 34 g (of which fructose 23 g, lactose 7.5 g, sucrose 1.4 g), fat 36 g; dietary fiber 18.5 g (of which 12.2 g inulin); Sodium: 0.10 g. Chocolate content minimum 50 wt %.

Example F5: Cereal Mixture with Flavoring Substance-Included Compound According to the Invention

| No. | | A (wt %) | B (wt %) | C (wt %) |
|---|---|---|---|---|
| 1 | Rolled oats | 17.00 | 17.00 | 17.00 |
| 2 | Crispy oat flake clusters | 10.00 | 10.00 | 10.00 |
| 3 | Rice Krispies | 16.90 | 16.90 | 16.90 |
| 4 | Cornflakes | 16.50 | 16.50 | 16.50 |
| 5 | Currants | 3.50 | 3.50 | 3.50 |
| 6 | Hazelnuts, chopped | 2.50 | 2.50 | 2.50 |
| 7 | Glucose syrup from wheat, DE 30 | 9.50 | 9.50 | 9.50 |
| 8 | Sucrose | 19.00 | 19.00 | 19.00 |
| 9 | Water | 4.00 | 4.00 | 4.00 |
| 10 | Powdered citric acid, anhydrous | 0.10 | 0.10 | 0.10 |
| 11 | Flavoring substance-included compound from example 13 | 1.00 | — | 0.50 |
| 12 | Flavoring substance-included compound from example 19 | — | 1.00 | 0.50 |

Constituents No.'s 1 to 6 are mixed in a rotary drum (Mix 1). Constituents No.'s 7 to 9 are heated and constituents No.'s 10 to 12 are added (Mix 2). Mix 2 is added to Mix 1 and mixed well. Finally the resulting cereal mixture is placed on a baking sheet and dried in an oven at 130° C. for 8 minutes.

Example F6: Fruit Gums with Flavoring Substance-Included Compound According to the Invention

| Ingredients: | A (wt %) | B (wt %) |
|---|---|---|
| Water | 22.70 | 24.70 |
| Sucrose | 34.50 | 8.20 |
| Glucose syrup, DE 40 | 31.89 | 30.09 |
| Iso Syrup C* Tru Sweet 01750 (Cerestar GmbH) | 1.50 | 2.10 |
| Gelatin 240 Bloom | 8.20 | 9.40 |
| Polydextrose (Litesse ® Ultra, Danisco Cultor GmbH) | — | 24.40 |
| Yellow and red coloring | 0.01 | 0.01 |
| Citric acid | 0.20 | 0.10 |
| Orange flavoring | — | 0.10 |
| Flavoring substance-included compound from example 12 | 1.0 | 0.90 |

Example F7: Chewing Candy with Flavoring Substance-Included Compound According to the Invention List of Ingredients:

| Water | | 7.7% |
|---|---|---|
| Sugar | Raffinade C4 | 41.0% |
| Glucose syrup | Dextrose 40 | 37.3% |
| Hardened vegetable fat | Melting point 32-36° C. | 6.6% |
| Lecithin | Emulsifier (Soya lecithin) | 0.3% |
| Gelatin | Pork gelatin | 0.8% |
| Fondant | Type-S30 | 4.9% |
| Flavoring substance-included compound from example 14 | | 1.4% |

Example F8: Fruit Muesli Bar with Flavoring Substance-Included Compound According to the Invention List of Ingredients:

| Sucrose | Sugar | 17.0% |
|---|---|---|
| Dextrose 40 | Glucose syrup | 14.7% |
| Sorbit P 300 | Humectant | 5.0% |
| Vegetable fat | Melting point 37° C. | 5.0% |
| Water | | 3.0% |
| Rolled oats | | 13.3% |
| Oat flakes | Oat extrudate | 10.0% |
| Cornflakes | | 5.5% |
| Rice Krispies | Rice extrudate | 20.0% |
| Currants | | 5.0% |
| Flavoring substance-included compound from example 13 | | 1.3% |
| Citric acid, powder | | 0.2% |

Example F9: Waffle Fatty Filling with Flavoring Substance-Included Compound According to the Invention List of Ingredients:

| Vegetable hard fat | Melting point 33-35° C. | 42.2% |
|---|---|---|
| Sugar powder | | 37.0% |
| Dextrose | Dextrose, anhydrous, micro-fine | 19.0% |
| Citric acid | | 0.3% |
| Flavoring substance-included compound from example 12 | | 1.5% |

Production instructions: Bring the fat to ambient temperature of approximately 21° C. Finely sieve the sugar powder. Beat all the ingredients, including flavoring, in a Hobart laboratory mixer.

Example F10: Madeira Cake with Flavoring Substance-Included Compound According to to the Invention List of Ingredients/Basic Recipe for Madeira Cake:

| Wheat flour | Type 405 | 15.90% |
|---|---|---|
| Wheat starch | | 4.40% |
| Sucrose | Sugar, EC Grade I | 19.20% |
| Cooking salt | | 0.14% |
| Potato flour | | 6.22% |
| Egg yolk solids | | 1.84% |
| Baking powder | | 0.70% |
| Beating emulsifier | Mono-diglyceride | 1.42% |
| Water | | 18.85% |
| Pure fat | Melting point approximately 34° C. | 13.89% |

-continued

| | | |
|---|---|---|
| Eggs | | 16.02% |
| Beta-carotene 1% solution | | 1.41% |
| Flavoring substance-included compound from example. 24 | | 0.01% |

Production Instructions:

Bring the fat to temperature. Place all dry matter, including the encapsulation product according to the invention, in the mixing bowl of the Hobart laboratory mixer. Then add the pure fat, water and eggs and beat for 1 minute at level 1 and 2 minutes at level 3. Place the dough in a baking tin and bake for 55 minutes at 180° C.

Example F11: Short Pastry Biscuits (Industrial Quality) with Flavoring Substance-Included Compound According to the Invention List of Ingredients:

| | | |
|---|---|---|
| Wheat flour | Type 550 | 53.49% |
| Soft vegetable fat | Melting point 24/26° C. | 19.0% |
| Sugar powder | | 19.0% |
| Salt | | 0.4% |
| Ammonium bicarbonate | Leavening | 0.4% |
| Skimmed milk powder | | 1.0% |
| Maltose syrup | DE 60,5 | 1.2% |
| Water | | 5.50% |
| Flavoring substance-included compound from example 13 | | 0.005% |

Production Instructions:

a) Allow the sugar powder, maltose syrup, skimmed milk powder and soft vegetable fat to run smooth in the Hobart laboratory kneader at level 1.

b) Using some of the water to dissolve the ammonium bicarbonate and add the remaining water to the mixture from a) and mix briefly.

c) Add the remaining ingredients with the flavoring substance-included compound from example 28 to mixture a) and work into a smooth dough.

d) Roll out the dough with the rolling machine to a thickness of approximately 3 mm, mark out a sample possibly using a wooden cutter, and cut out in the desired shape.

Final thickness of the dough: approximately 2.6 mm; oven temperature: 200° C., baking time: 6 minutes.

Example F12: Snack Item with Flavoring Substance-Included Compound According to the Invention Example Recipe for the Production of Crackers:

wheat flour (60-63%), baking powder (1.0-1.5%), vegetable fat (6.0-6.5%), maltose syrup (2.0-2.5%), emulsifier (1.2-1.8%), ammonium bicarbonate (1.5-2.0%), spray-process skimmed milk powder (1.0-1.5%), fresh baker's yeast (0.3-0.9%), table salt (0.3-0.6%), water (20.0-23.5%), flavoring substance compound according to the invention (approximately 0.01 wt %), here preferably a flavoring substance-included compound according to example 21.

The crackers are baked or deep-fried following the mixing of the ingredients.

Example F13: Seasoning with Flavoring Substance-Included Compound According to the Invention Example Recipe for the Production of Seasonings, e.g. For Snack Items:

table salt (10-25%), carrier (e.g. whey powder) (40-60%), filler (e.g. fat powder) (5-15%), flavor enhancer (1.5-3.5%), adjuvant (e.g. silicic acid) (0, 1-5%), cheese powder (10-30%), hydrolyzed vegetable proteins (5-10%), yeast extract (5-15%), spices (1-5%), acidifier (e.g. citric acid) (0.1-1.0%), coloring (e.g. paprika extract) (0.1-1.0%), flavoring substance compound according to the invention from example 21 (0.05-0.5 wt %).

Example F14: Cream of Leek Soup with Flavoring Substance-Included Compound According to the Invention A cream of leek soup is produced according to the following formulation: milk fat element, Vana Crema (25-30%), potato starch (15-25%), milk sugar, lactose (18-22%), maltodextrin (10-12%), salt (7-9%), monosodium glutamate (2-4%), vegetable fat (2-4%), spinach powder (1-2%), citric acid powder (0.2-0.4%), leek powder (1-2%), freeze-dried leek particles (approximately 10×10 mm) (0.5-1.5%), vegetable stock powder (0.2-0.5%), curcuma extract (0.05-0.1%), inclusion product according to the invention from example 22 (0.01-0.1 wt %).

Example F15: Blend of Spices for Crisps with Flavoring Substance-Included Compound According to the Invention

| Ingredient | Formulation A |
|---|---|
| Monosodium glutamate | 3.50 g |
| Cheese powder | 10.00 g |
| Garlic powder | 2.00 g |
| Whey powder | 38.86 g |
| Spice extract oil | 0.20 g |
| Paprika powder | 9.80 g |
| Cooking salt | 19.00 g |
| Tomato powder | 9.00 g |
| Dry flavoring | 2.50 g |
| Silicon dioxide | 0.02 g |
| Vegetable oil | 0.02 g |
| Onion powder | 3.00 g |
| Cheese flavoring | 0.03 g |
| Concentrated tomato flavoring | 0.04 g |
| Flavoring substance-included compound according to example 21 | 2.00 g |

6 g of the blend of spices are spread over 94 g of crisps.

Example F16: White Sauce with Flavoring Substance-Included Compound According to the Invention

| Ingredient | Formulation |
|---|---|
| Maltodextrin | 28.42 g |
| Cooking salt | 5.35 g |
| Monosodium glutamate | 2.00 g |
| Vegetable fat | 5.00 g |
| White pepper | 0.02 g |
| Onion powder | 1.50 g |

-continued

| Ingredient | Formulation |
| --- | --- |
| Pre-gelatinized corn starch | 30.00 g |
| Fat powder | 27.70 g |
| Flavoring substance-included compound according to example 24 | 0.01 g |

Hot water is poured onto 90 g of the sauce mixture and vigorously stirred with the whisk.

Example F17: Brown Sauce with Flavoring Substance-Included Compound According to the Invention

| Ingredient | Formulation |
| --- | --- |
| Starch | 39.00 g |
| Maltodextrin | 34.09 g |
| Cooking salt | 6.00 g |
| Spirit caramel, spray-dried | 5.00 g |
| Yeast extract powder | 3.00 g |
| Monosodium glutamate | 2.00 g |
| Sugar | 0.50 g |
| Fat powder | 5.00 g |
| Tomato powder | 3.00 g |
| Natural vegetable extract | 1.00 g |
| Onion extract | 0.30 g |
| Pepper extract | 0.10 g |
| Dry flavor | 1.00 g |
| Flavoring substance-included compound according to example 20 | 0.01 g |

1,000 ml of hot water are poured onto 90 g of the sauce mixture and vigorously stirred with the whisk.

Example F18: Tomato Soup with Flavoring Substance-Included Compound According to the Invention

| Ingredient | Formulation |
| --- | --- |
| Water | 50.70 g |
| Vegetable oil | 5.50 g |
| Tomato paste | 24.00 g |
| Cream | 1.00 g |
| Sugar | 2.00 g |
| Cooking salt | 1.70 g |
| Monosodium glutamate | 0.40 g |
| Wheat flour | 5.50 g |
| Starch | 1.20 g |
| Diced tomatoes | 7.50 g |
| Flavoring substance-included compound according to example 23 | 0.5 g |

The solid ingredients are weighed, mixed and added to the water. The vegetable oil is dosed in and the tomato paste added. The mixture is boiled whilst stirring.

Example F19: Instant Soup with Flavoring Substance-Included Compound According to the Invention, Type: Cream of Leek

| Ingredient | Weight |
| --- | --- |
| Potato starch | 20.0 g |
| Fat powder | To 100 g |
| Lactose | 20.0 g |
| Maltodextrin | 11.73 g |
| Cooking salt | 8.0 g |
| Monosodium glutamate | 3.0 g |
| Spinach powder | 2.0 g |
| Green leek powder | 2.0 g |
| Citric acid, in powder form | 0.3 g |
| Hardened vegetable fat | 3.0 g |
| Freeze-dried leek | 1.0 g |
| Chicken flavoring | 1.0 g |
| Spice blend, "fried onions" type | 0.6 g |
| Yeast-spice mixture, "vegetable stock" type, powder | 0.3 g |
| Curcuma extract | 0.07 g |
| Flavoring substance-included compound according to example 22 | 0.1 g |

100 ml of hot water are poured onto 5 g of the powder mixture, in order to obtain a ready-to-eat soup.

Example F20: Spice Blend with Flavoring Substance-Included Compound According to the Invention, "Pepper" Type"

| Ingredient | Formulation |
| --- | --- |
| Milk protein | 0.8 g |
| Carob gum | 2.0 g |
| Corn starch | To 100 g |
| Cooking salt | 14.0 g |
| Paprika powder | 12.0 g |
| Tomato powder | 12.0 g |
| Sucrose | 4.0 g |
| Garlic powder | 0.5 g |
| Hardened vegetable fat | 8.0 g |
| Fat powder | 10.0 g |
| Monosodium glutamate | 6.0 g |
| Food coloring beetroot and paprika | 2.0 g |
| Flavoring, "pepper" type | 2.0 g |
| Flavoring, "pizza" type | 1.2 g |
| Flavoring substance-included compound according to example 21 | 0.4 g |
| Extract of black pepper | 0.1 g |

100 g of pork chops are evenly sprinkled with 1.7 g of the preparation and fried.

Example F21: Stock with Flavoring Substance-Included Compound According to the Invention

| Ingredient | Weight |
| --- | --- |
| Fat powder | 8.77 g |
| Monosodium glutamate | 8.77 g |
| Yeats extract powder | 12.28 g |
| Cooking salt | 29.83 g |
| Maltodextrin | To 100 g |

-continued

| Ingredient | Weight |
| --- | --- |
| Natural vegetable extract | 3.07 g |
| Flavoring substance-included compound according to example 22 | 0.01 g |
| Flavoring substance-included compound according to example 21 | 0.5 g |

1,000 ml of hot water are poured over 15 g of the powder mixture and possibly boiled for up to 30 minutes, wherein additional noodles can be added.

Example F22: Tomato Ketchup with Flavoring Substance-Included Compound According to the Invention

| Ingredient | (wt %) |
| --- | --- |
| Cooking salt | 2 |
| Starch, Farinex WM 55 | 1 |
| Sucrose | 12 |
| Hesperetin 2.5% in 1,2-propylene glycol | 0.4 |
| Tomato concentrate, double strength | 40 |
| Glucose syrup 80 Brix | 18 |
| Brandy vinegar 10% | 7 |
| Water | To 100 |
| Flavoring substance-included compound according to example 23 | 0.5 |

The contents are mixed in the specified order and the finished ketchup is homogenized using a stirrer, filled in bottles and sterilized.

The invention claimed is:

1. A preparation or semi-finished product selected from the group consisting of a foodstuff and oral care products comprising an included compound composition comprising:
   (i) 75 to 99 wt % of a polymer of Formula (I),

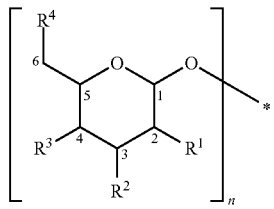

wherein n is in the range of 100 to 8,000, and
wherein for each individual monomer set in brackets in formula (I):
$R^1$ is —OH, —NH$_2$ or —NH—CO—CH$_3$,
one or two moieties selected from $R^2$, $R^3$ and $R^4$ are —OH, and
instead of any remaining moiety or moieties $R^2$, $R^3$ and $R^4$, the corresponding carbon atom at position 3, 4 and 6, respectively, is covalently linked to another monomer via the free bond of oxygen of formula (I), wherein the polymer is not cellulose or amylose, and wherein the polymer is included with
(ii) a total of 1 to 25 wt % of one or more-flavoring substances selected from the group consisting of 3-carene; alpha-pinene; beta-pinene; alpha-terpinene; gamma-terpinene; p-cymene; bisabolene; camphene; caryophyllene; cedrene; farnesene; limonene; longifolene; myrcene; ocimene; valencene; and (E,Z)-1,3,5-undecatriene; and, wherein the weight percents of (i) and (ii) are in relation to the total weight of the included compound composition.

2. The preparation or semi-finished product of claim 1, wherein the polymer comprises monomers having a glycosidic bond at carbon atom position 1.

3. The preparation or semi-finished product of claim 1, wherein
   at least 70% of the monomers of the polymer of formula (I) are identical, or
   in at least 70% of the monomers of the polymer of formula (I) $R^1$ is identical and selected from —NH$_2$ and —NH—CO—CH$_3$.

4. The preparation or semi-finished product of claim 1, wherein
   (i) the monomers of the polymer of formula (I) are connected via an alpha- or beta-glycosidic bond selected from the group consisting of 1,3 glycosidic bonds, 1,4 glycosidic bonds and 1,6 glycosidic bonds, and
   (ii) the polymer comprises one or more of the types of glycosidic bonds defined in (i), and simultaneously comprises
   alpha-1,4 and alpha-1,6 glycosidic bonds, and/or
   alpha-1,2, beta-1,4 and beta-1,6 glycosidic bonds, and/or
   beta-1,3 and beta-1,4 glycosidic bonds, and/or
   beta-1,3 and beta-1,6 glycosidic bonds.

5. The preparation or semi-finished product of claim 1, wherein the polymer is selected from chitin, chitosan, dextran, mutan, glycogen, pullulan, amylopectin, curdlan, laminarin, chrysolaminarin, lentian, lichenin, pleuran, zymosan, schizophyllan, scleroglucan and beta-glucan.

6. The preparation or semi-finished product of claim 1, wherein the polymer is chitosan having a degree of deacetylation of 50-100%.

7. The preparation or semi-finished product of claim 1, wherein at least one of the included flavoring substances has a log POW of greater than 1.0.

8. The preparation or semi-finished product of claim 1 wherein the foodstuff or oral care products comprise a mixture comprising the inclusion compound composition 1 and water.

9. The preparation or semi-finished product of claim 8 wherein the mixture comprises a total of 85 to 99.9 wt % of the inclusion compound composition and
   0.1 to 15 wt % of water,
   in each case in relation to the total weight of the mixture.

10. The preparation or semi-finished product of claim 1 wherein the inclusion compound composition is made by a method, comprising
    a first step of inclusion of one or more primary swelling agent in the polymer of formula (I);
    a second step of from 50% to complete replacement of included swelling agents by one or more flavoring substances, so that the flavoring substances are included in the polymer of formula (I).

11. The preparation or semi-finished product of claim 10 wherein in the method the swelling agent(s) included in the first step are replaced in an amount of from 50% to 99%, and wherein the method further comprises:
    a third step of removal of included swelling agents not replaced by flavoring substances.

12. The preparation or semi-finished product of claim 10 wherein in the method further comprises:
    a first intermediary step between the first step and the second step which comprises from 50% to complete replacement of included primary swelling agents by one or more secondary swelling agents, so that these are included in the polymer of formula (I).

13. The preparation or semi-finished product of claim 10 wherein in the method one or more of the primary swelling agents are selected from the group consisting of water, glycerine, propylene glycol, formic acid, ammonia and mixtures thereof, or wherein the primary swelling agent is acetic acid.

14. The preparation or semi-finished product of claim 12 wherein in the method, one or more of the primary swelling agents to be replaced in the first intermediary step are selected from the group consisting of water, glycerine, propylene glycol, formic acid, ammonia and mixtures thereof.

15. The preparation or semi-finished product of claim 12 wherein in the method one or more of the secondary swelling agents are selected from the group consisting of ethanol, propanol, butanol, butyric acid, propionic acid and mixtures thereof.

16. The preparation or semi-finished product of claim 10 wherein in the method in the first step less than 90 wt. % of the polymer of formula (I) is dissolved in the primary swelling agent selected from the group consisting of water, glycerine, propylene glycol, formic acid, ammonia and mixtures of thereof, or acetic acid.

17. The preparation or semi-finished product of claim 10 wherein in the method, wherein in the first step a mixture of one or more primary swelling agents are selected from the group consisting of water, glycerine, propylene glycol, formic acid, ammonia and mixtures thereof, and one or more secondary swelling agents is used, and wherein the ratio of the total of the primary swelling agents to the total of the secondary swelling agents is 1:9 to 9:1.

18. The preparation or semi-finished product of claim 12 wherein in the method, wherein one or more of the primary swelling agent(s) and/or the secondary swelling agent(s) has (have) a higher vapor pressure than one or more of the flavoring substance(s) used in the second step.

19. The preparation or semi-finished product of claim 10 wherein in the method, the swelling agent to be replaced in the second step is a component of a starting mixture containing the polymer of formula (I), included swelling agent, and non-included swelling agent, wherein the total proportion of included and non-included swelling agent is in the range of 5 to 90 wt %, in relation to the total weight of the polymer of formula (I).

20. The preparation or semi-finished product of claim 8 wherein the mixture further comprises flavoring substances not included in the polymer of formula (I).

21. The preparation or semi-finished product of claim 20, wherein the proportion of the included compound composition, and water present is 50 to 99.9 wt % and the proportion of the flavoring substances not included in the polymer of formula (I) is 0.1 to 50 wt %, in each case in relation to the total weight of the mixture.

22. The preparation or semi-finished product of claim 1 which is a foodstuff.

23. The preparation or semi-finished product according to claim 22, wherein the total quantity of the included compound composition according to claim 1 in relation to the total weight of the foodstuff is in the range of 0.001 to 10 wt %.

24. The preparation or semi-finished product of claim 1 wherein n is in the range of 150 to 6,000.

25. The preparation or semi-finished product of claim 4 wherein the alpha- or beta-glycosidic bond defined in (i) is selected from alpha-1,4 glycosidic bonds, alpha-1,6 glycosidic bonds, beta-1,3 glycosidic bonds, beta-1,4 glycosidic bonds and beta-1,6 glycosidic bonds.

26. The preparation or semi-finished product of claim 1 wherein the flavoring substance(s) (ii) are present in an amount of from about 5 to about 25 wt %.

27. The preparation or semi-finished product of claim 12 wherein the method further comprises after first intermediary step and prior to second step, a second intermediary step which comprises from 50% to complete replacement of secondary swelling agents included in the polymer of formula (I) by one or more further secondary swelling agent(s).

28. The preparation or semi-finished product of claim 27 wherein the second intermediary step is repeated one or more times.

29. The preparation or semi-finished product of claim 10 wherein the primary swelling agent is acetic acid.

30. The preparation or semi-finished product of claim 1 which is a foodstuff which is selected from the group consisting of bakery products, confectionery, fat masses, toppings, alcoholic or non-alcoholic beverages, instant beverages or instant powders, meat products, eggs or egg products, cereal products and/or nut products, dairy products, products made from Soya protein or other Soya bean fractions, fruit preparations, vegetable preparations, snack articles, fat- and oil-based products or corresponding emulsions, ready-to-serve meals and soups, spices, and seasoning mixtures.

31. The preparation or semi-finished product of claim 30 wherein the foodstuff is chewing gum.

32. The preparation or semi-finished product of claim 1 which is an oral care product and wherein the oral care product is toothpaste.

* * * * *